United States Patent
Dabrowski

(10) Patent No.: US 7,520,810 B2
(45) Date of Patent: Apr. 21, 2009

(54) METHOD AND APPARATUS FOR SCRIP DISTRIBUTION AND MANAGEMENT PERMITTING REDISTRIBUTION OF ISSUED SCRIP

(76) Inventor: Stanley P. Dabrowski, 2801 Deep Water Cir., Las Vegas, NV (US) 89117

( * ) Notice: Subject to any disclaimer, the term of this patent is extended or adjusted under 35 U.S.C. 154(b) by 502 days.

(21) Appl. No.: 10/893,786

(22) Filed: Jul. 16, 2004

(65) Prior Publication Data

US 2005/0003889 A1  Jan. 6, 2005

Related U.S. Application Data

(63) Continuation of application No. 09/939,922, filed on Aug. 27, 2001, now abandoned, which is a continuation-in-part of application No. 09/368,036, filed on Aug. 3, 1999, now Pat. No. 6,379,246, said application No. 09/939,922 is a continuation-in-part of application No. 09/368,296, filed on Aug. 3, 1999, now Pat. No. 6,253,119, said application No. 09/939,922 is a continuation-in-part of application No. 09/368,096, filed on Aug. 3, 1999, now Pat. No. 6,263,258, said application No. 09/939,922 is a continuation-in-part of application No. 09/366,224, filed on Aug. 3, 1999, now Pat. No. 6,598,788.

(60) Provisional application No. 60/095,091, filed on Aug. 3, 1998.

(51) Int. Cl.
  *G06F 17/00* (2006.01)
(52) U.S. Cl. ........................................................ 463/25
(58) Field of Classification Search ............. 463/16–25; 235/281
See application file for complete search history.

(56) References Cited

U.S. PATENT DOCUMENTS 4,689,742 A   8/1987  Troy et al. .................... 463/25

(Continued)

FOREIGN PATENT DOCUMENTS

DE       3406058       8/1985

(Continued)

OTHER PUBLICATIONS

Non-final Office Action dated Jul. 03, 2001 in U.S. Appl. No. 09/368,038, filed Aug. 03, 1999 by Dabrowski, issued Apr. 30, 2002 as U.S. Patent No. 6,379,246.

(Continued)

*Primary Examiner*—Ronald Laneau
(74) *Attorney, Agent, or Firm*—Gates & Cooper LLP

(57) ABSTRACT

A method, apparatus, and article of manufacture for transferring credits from one gaming device to another via the use of coded scrip is disclosed. The method comprises the steps of accepting a cash-out command in the gaming device, scanning a magnetically manifested code uniquely identifying a scrip stored in the gaming device, transmitting a cash-out message comprising the code to a remote processor having access to a database configured to store and retrieve codes from a plurality of gaming devices, receiving a scrip dispense message from the remote processor, and dispensing the scrip. The apparatus comprises a scrip storage unit, a scrip dispensing unit having a scrip transducer for reading and recording a magnetically manifested code on a scrip retrieved from the scrip storage unit, and a processor, communicatively coupled to the scrip transducer and a remote computer having access to a database for storing and retrieving code information from the plurality of gaming devices.

18 Claims, 20 Drawing Sheets

U.S. PATENT DOCUMENTS

| | | | |
|---|---|---|---|
| 4,835,624 A | 5/1989 | Black et al. ..................... 360/2 |
| 4,858,123 A | 8/1989 | Alexoff et al. .............. 101/484 |
| 4,880,237 A | 11/1989 | Kishishita |
| 5,007,627 A | 4/1991 | Giannetti et al. |
| 5,179,517 A | 1/1993 | Sarbin et al. ................. 364/410 |
| 5,231,568 A | 7/1993 | Cohen et al. ................. 364/401 |
| 5,239,165 A | 8/1993 | Novak |
| 5,251,738 A | 10/1993 | Dabrowski |
| 5,265,874 A | 11/1993 | Dickinson et al. ....... 273/138 A |
| 5,290,033 A | 3/1994 | Bittner et al. |
| 5,350,168 A | 9/1994 | Sheridan |
| 5,371,345 A | 12/1994 | LeStrange et al. ........... 235/380 |
| 5,420,406 A | 5/1995 | Izawa et al. ................. 235/379 |
| 5,429,361 A | 7/1995 | Raven et al. ............ 273/138 A |
| 5,470,079 A | 11/1995 | LeStrange et al. ....... 273/138 A |
| 5,475,205 A | 12/1995 | Behm et al. ................. 235/375 |
| 5,544,728 A | 8/1996 | Dabrowski |
| 5,557,086 A | 9/1996 | Schulze et al. .............. 235/380 |
| 5,577,959 A | 11/1996 | Takemoto et al. ............. 463/25 |
| 5,580,311 A | 12/1996 | Haste, III ..................... 463/29 |
| 5,595,538 A | 1/1997 | Haste, III ..................... 463/17 |
| 5,627,356 A | 5/1997 | Takemoto et al. |
| 5,692,743 A | 12/1997 | Yano et al. |
| 5,709,603 A | 1/1998 | Kaye |
| 5,772,510 A | 6/1998 | Roberts |
| 5,791,990 A | 8/1998 | Schroeder et al. |
| 5,818,026 A | 10/1998 | Melling et al. |
| 5,871,398 A | 2/1999 | Schneier et al. ............... 463/16 |
| 5,901,951 A | 5/1999 | Yamaguchi |
| 5,915,588 A | 6/1999 | Stoken et al. |
| 6,012,832 A | 1/2000 | Saunders et al. ............ 235/380 |
| 6,014,594 A | 1/2000 | Heidel et al. |
| 6,024,640 A | 2/2000 | Walker et al. ................. 463/17 |
| 6,048,269 A | 4/2000 | Burns et al. ................... 463/25 |
| 6,048,271 A | 4/2000 | Barcelou |
| 6,056,289 A | 5/2000 | Clapper, Jr. |
| 6,098,837 A | 8/2000 | Izawa et al. |
| 6,110,044 A | 8/2000 | Stern |
| 6,113,492 A | 9/2000 | Walker et al. |
| 6,128,550 A | 10/2000 | Heidel et al. |
| 6,170,744 B1 | 1/2001 | Lee et al. |
| 6,190,256 B1 | 2/2001 | Walker et al. .................. 463/25 |
| 6,241,118 B1 | 6/2001 | Tramontina |
| 6,253,119 B1 | 6/2001 | Dabrowski |
| 6,263,258 B1 | 7/2001 | Dabrowski |
| 6,270,406 B1 | 8/2001 | Sultan ......................... 463/17 |
| 6,280,326 B1 | 8/2001 | Saunders |
| 6,340,331 B1 | 1/2002 | Saunders et al. |
| 6,347,794 B2 | 2/2002 | Scrymgeour et al. |
| 6,379,246 B1 | 4/2002 | Dabrowski |
| 6,527,638 B1 | 3/2003 | Walker et al. .................. 463/25 |
| 6,547,664 B2 | 4/2003 | Saunders |
| 6,558,256 B1 | 5/2003 | Saunders |
| 6,598,788 B1 | 7/2003 | Dabrowski |
| 6,623,357 B2 | 9/2003 | Chowdhury |
| 6,650,427 B2 | 11/2003 | Brooks et al. |
| 7,036,721 B2 | 5/2006 | Dabrowski |
| 2002/0160832 A1 | 10/2002 | Burns et al. |
| 2003/0166412 A1 | 9/2003 | Marcu |
| 2003/0171145 A1 | 9/2003 | Rowe |
| 2004/0204235 A1* | 10/2004 | Walker et al. .................. 463/29 |

FOREIGN PATENT DOCUMENTS

| | | |
|---|---|---|
| WO | WO 94/16781 | 8/1994 |
| WO | WO 95/24689 | 9/1995 |
| WO | WO 98/59311 | 12/1998 |
| WO | WO 9922350 | 6/1999 |

OTHER PUBLICATIONS

Non-final Office Action dated Apr. 23, 2003 in U.S. Appl. No. 09/939,922, filed Aug. 27, 2001 by Stanely P. Dabrowski, now abandoned.

Final Office Action dated Nov. 10, 2003 in U.S. Appl. No. 09/939,922, filed Aug. 27, 2001 by Stanley P. Dabrowski, now abandoned.

* cited by examiner

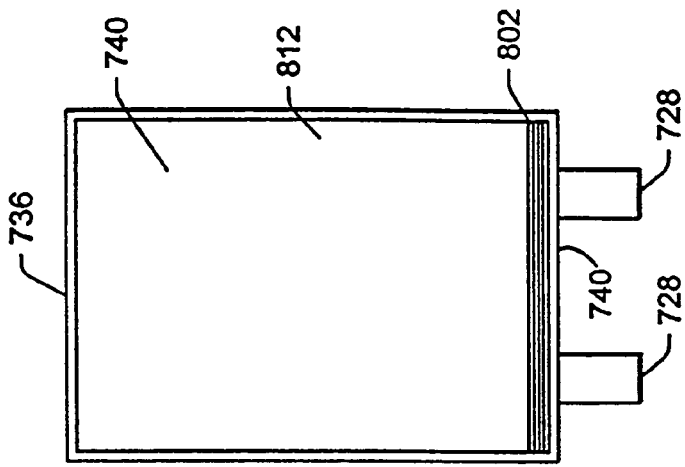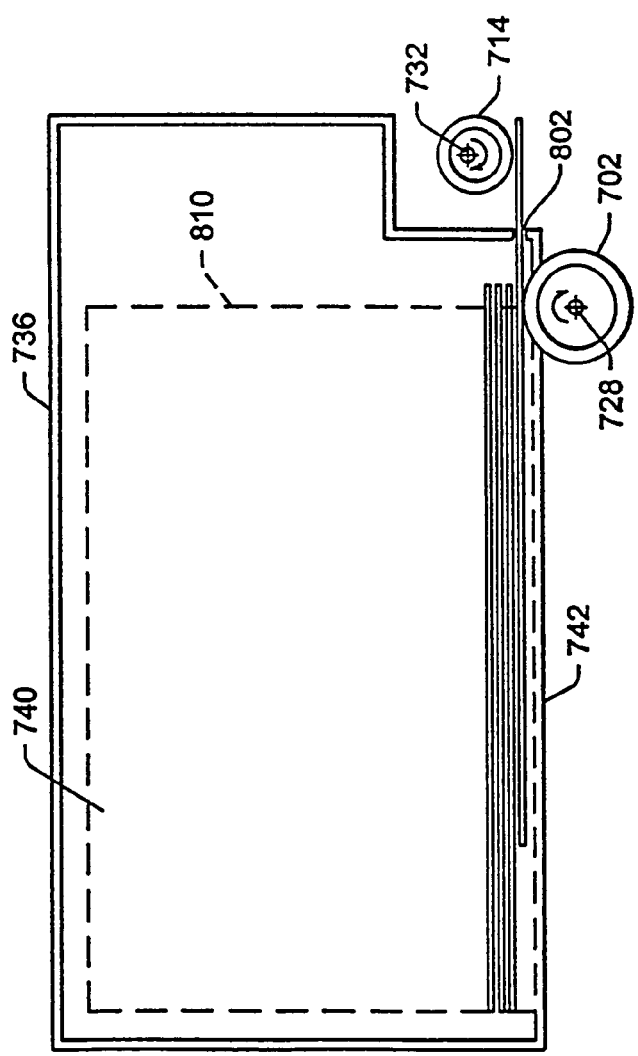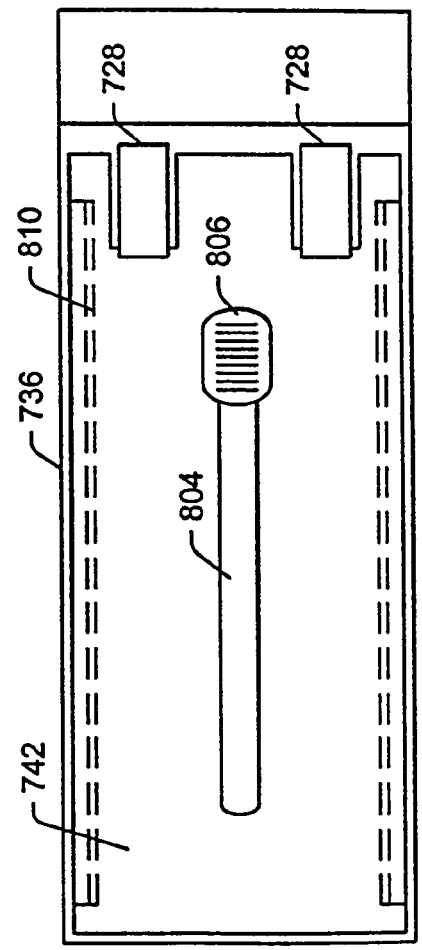
FIG. 8

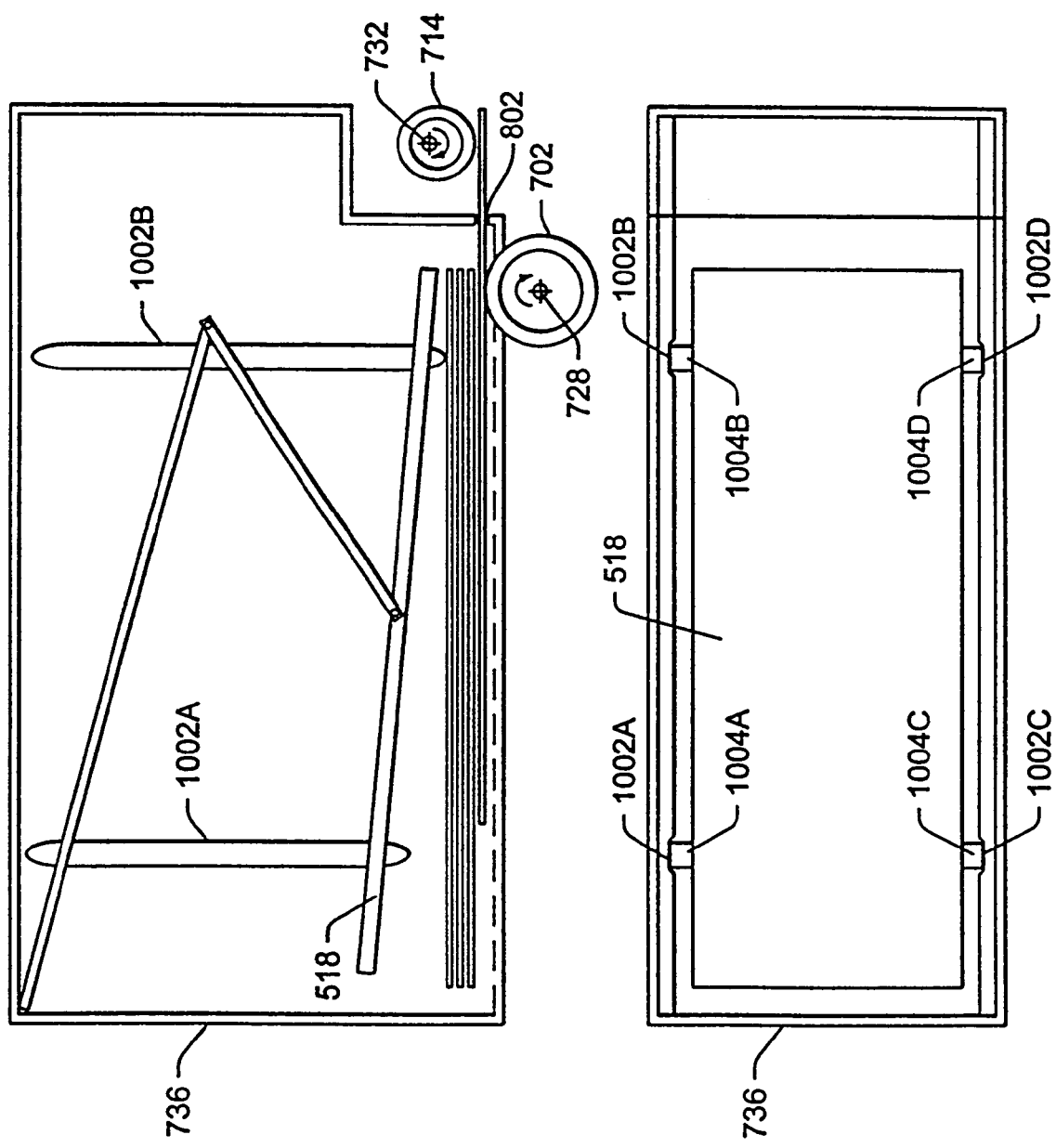

METHOD AND APPARATUS FOR SCRIP DISTRIBUTION AND MANAGEMENT PERMITTING REDISTRIBUTION OF ISSUED SCRIP

CROSS REFERENCE TO RELATED APPLICATIONS

This application is a continuation of application Ser. No. 09/939,922, filed Aug. 27, 2001 now abandoned, by Stanley P. Dabrowski, and entitled "METHOD AND APPARATUS FOR SCRIP DISTRIBUTION AND MANAGEMENT PERMITTING REDISTRIBUTION OF ISSUED SCRIP", which application is a continuation-in-part of the following applications, each of which applications are hereby incorporated by reference herein:

application Ser. No. 09/368,036, filed Aug. 3, 1999, by Stanley P. Dabrowski and entitled "METHOD AND APPARATUS FOR MODIFYING GAMING MACHINES TO PROVIDE SUPPLEMENTAL OR MODIFIED FUNCTIONALITY", which application claims benefit of U.S. Provisional Application No. 60/095,091, filed Aug. 3, 1998 by Stanley P. Dabrowski and entitled "METHOD AND APPARATUS FOR SCRIP DISTRIBUTION AND MANAGEMENT", and which issued Apr. 30, 2002 as U.S. Pat. No. 6,379,246;

application Ser. No. 09/368,296, filed Aug. 3, 1999, by Stanley P. Dabrowski and entitled "METHOD AND APPARATUS FOR CONTROLLING A COIN HOPPER TO OPERATE WITH A SECONDARY MONETARY EXCHANGE DISPENSER", which application claims benefit of U.S. Provisional Application No. 60/095,091, filed Aug. 3, 1998 by Stanley P. Dabrowski and entitled "METHOD AND APPARATUS FOR SCRIP DISTRIBUTION AND MANAGEMENT", and which issued Jun. 26, 2001 as U.S. Pat. No. 6,253,119;

application Ser. No. 09/368,096, filed Aug. 3, 1999, by Stanley P. Dabrowski and entitled "SCRIP DISPENSER", which application claims benefit of U.S. Provisional Application No. 60/095,091, filed Aug. 3, 1998 by Stanley P. Dabrowski and entitled "METHOD AND APPARATUS FOR SCRIP DISTRIBUTION AND MANAGEMENT" and which issued Jul. 17, 2001 as U.S. Pat. No. 6,263,258; and application Ser. No. 09/366,224, filed Aug. 3, 1999, by Stanley P. Dabrowski and entitled "METHOD AND APPARATUS FOR SCRIP DISTRIBUTION AND MANAGEMENT", which application claims benefit of U.S. Provisional Application No. 60/095,091, filed Aug. 3, 1998 by Stanley P. Dabrowski and entitled "METHOD AND APPARATUS FOR SCRIP DISTRIBUTION AND MANAGEMENT", and which application issued Jul. 29, 2003 as U.S. Pat. No. 6,598,788.

BACKGROUND OF THE INVENTION

1. Field of the Invention

The present invention relates to systems and methods for managing currency transactions, and in particular, to an inexpensive system for securely distributing and accepting scrip at numerous widely distributed gaming devices.

2. Description of the Related Art

Recent years have seen a rapid expansion of the gaming industry. Much of the income derived from such games is collected at gaming devices like slot machines and video poker games.

Revenue from such gaming devices can be increased in one of two ways: by increasing the number of transactions or by increasing the average wager per transaction. The number of transactions can be most easily increased simply by increasing the number of available machines. However, increasing the number of gaming devices can be a costly enterprise.

In the past, most gaming machines used coins as a medium of exchange. The machine accepted the wager in coin, and if the player was successful, paid winnings immediately from coin stored in the machine itself. While effective, such coin machines are expensive to maintain. Since the money taken in by the gaming device generally exceeds jackpots paid out, the accumulated money (in coin) must be removed from each machine on a periodic basis. This collection can be difficult, because coins can be heavy and unwieldy.

Recent years have seen a movement away from coin-only machines and a proliferation of gaming machines that also accept currency as a medium of exchange. In fact, currently, 60% or more of gaming machines can accept wagers in currency. Although they represent an improvement from the coin machines of the past, currency-accepting gaming machines have proved to be no panacea. Currency acceptors do not obviate the need to pay out winnings in coin. For example, if the player cashes out with $25.50 remaining in the payout account, the gaming device can only issue winnings in coin (in this case, 104 quarters). Since players will often terminate play at such times, the coinage paid out generally exceeds wager coinage entered into the machine, and a cache of coin in the gaming device must be maintained and frequently replenished.

Gaming machines that deal with scrip can help ameliorate this problem. However, existing scrip distribution systems do not offer a complete solution to the problem. For example, the system disclosed by U.S. Pat. No. 6,012,832, issued Jan. 11, 2000 to Saunders et al. discloses a cashless peripheral device for a gaming system. With this system, when the user decides to cash out, the gaming system computes the amount of money due the player and prints a barcode representing this amount on a ticket that is drawn from a continuous roll of unprinted tickets. After printing, the printed bar code is read to verify that it is correct before the ticket is issued to the user. The code is also transmitted to a central computer for storage. The user can then insert the ticket in another gaming machine. By comparing the information on a player card with information printed on the ticket, a determination is made as to whether the ticket is valid. If the ticket is valid, the gaming machine itself determines the cash-in value from the printed code on the ticket. Credits are issued, and the ticket is passed into a storage bin and is eventually discarded.

There are a number of problems with such a system. First, it requires the use of a player card to store information that is used to validate the printed ticket. Second, there is no provision for the re-use of tickets. As a result, as was true with coins, each gaming device will have to be periodically emptied of discarded tickets. Further, the discarded tickets still present visible codes that can be collected and scanned, and may be used to compromise the security of the gaming system.

What is needed is a system which does not require the use of a player card to verify the validity issued scrip, provides for the re-use of scrip, and allows the scrip to be erased and re-used multiple times.

SUMMARY OF THE INVENTION

To address the requirements described above, the present invention discloses a method, apparatus, and article of manufacture for transferring credits from one gaming device to another via the use of coded scrip.

The method comprises the steps of accepting a cash-out command in the gaming device, scanning a magnetically manifested code uniquely identifying a scrip stored in the gaming device, transmitting a cash-out message comprising the code to a remote processor having access to a database configured to store and retrieve codes from a plurality of gaming devices, receiving a scrip dispense message from the remote processor, and dispensing the scrip. The apparatus comprises a scrip storage unit, a scrip dispensing unit having a scrip transducer for reading and recording a magnetically manifested code on a scrip retrieved from the scrip storage unit, and a processor, communicatively coupled to the scrip transducer and a remote computer having access to a database for storing and retrieving code information from the plurality of gaming devices.

This system relies on coupons or scrip cards that are inherently worthless and self-authenticating. These coupons are activated and dispensed to the user when a payout is requested, and deactivated when they are re-inserted into a gaming device. The coupons may also be erased and are then stored within the gaming machines for re-distribution and re-use.

BRIEF DESCRIPTION OF THE DRAWINGS

Referring now to the drawings in which like reference numbers represent corresponding parts throughout:

FIG. 8 is a diagram showing a schematic view of one embodiment of the cassette;

FIG. 10 is a diagram showing a further embodiment of the cassette;

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
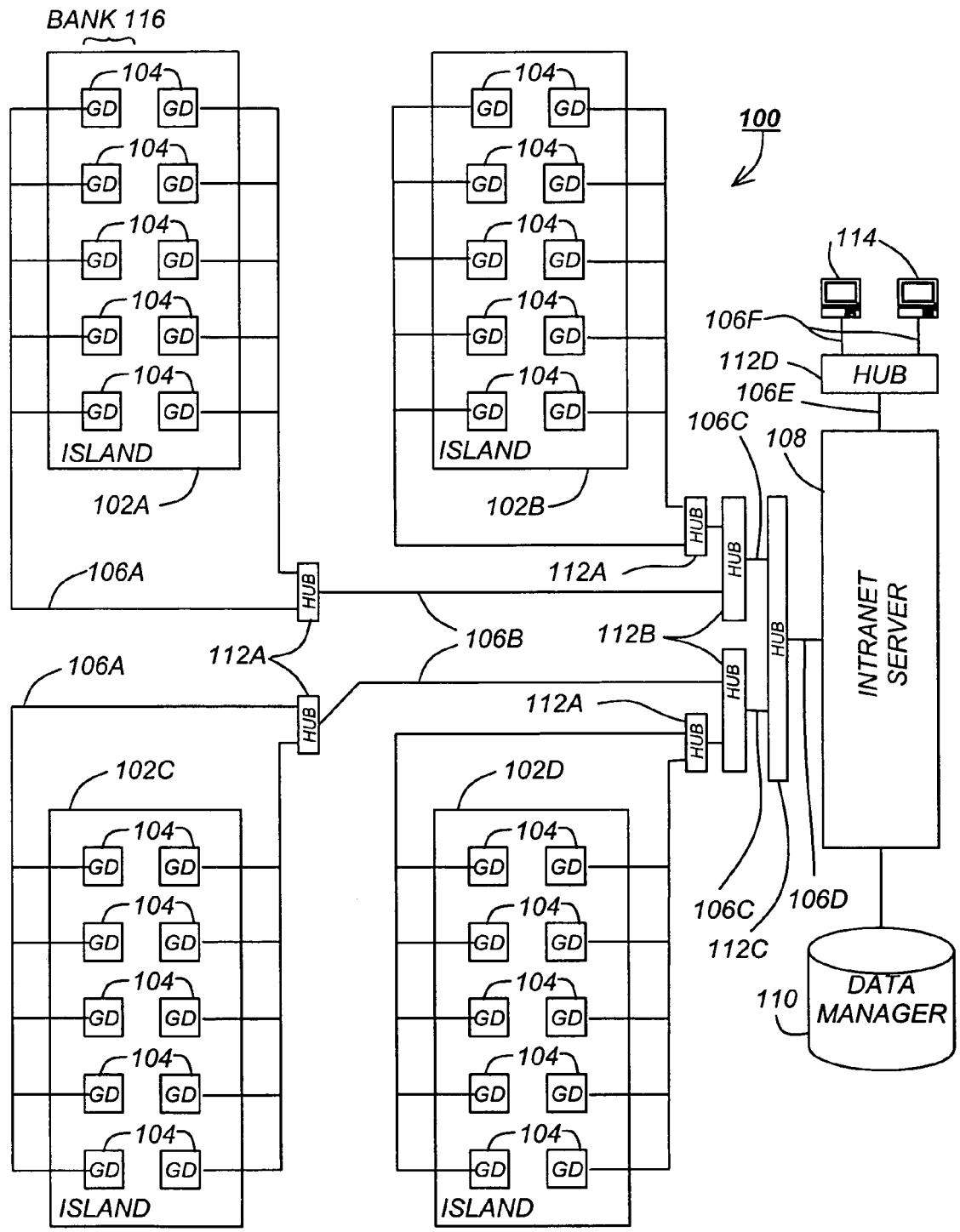
FIG. 1 is a block diagram showing an array of gaming devices.

FIG. 1 is a diagram illustrating a gaming system 100. The gaming system 100 comprises a plurality of gaming islands 102A-102D, each having a plurality of gaming devices 104. The gaming devices 104 are operatively coupled to an intranet server 108 via communication links 106A-106D. In one embodiment, communication link 106A is a 10Base2, 10 Mbps thin coaxial communication link. First hub 112A accepts multiple communication links 106A. Preferably, one cable segment is used per gaming machine bank 116. Communication link 106B is a 10BaseT, 10 Mbps Cat 5 cable which covers the gaming devices in an island 102A or other sub-area. Second hub 112B accepts multiple communication links 106B. Communication link 106C is a 100BaseFX, 100 Mbps fiber optic link servicing a major area of gaming machines. Third hub 112C accepts multiple communication links 106C, and implements path redundancy and the network backbone. Communication link 106D is a 100BaseT, 100 Mbps Cat 5 cable. The intranet server 108 is also operatively coupled to a data manager 110 and to workstations 114 via communication links 106E-106F. In one embodiment, the intranet server 108 is firewall protected, and includes one or more work station terminals intercoupled via a local area network.

Figure 2:
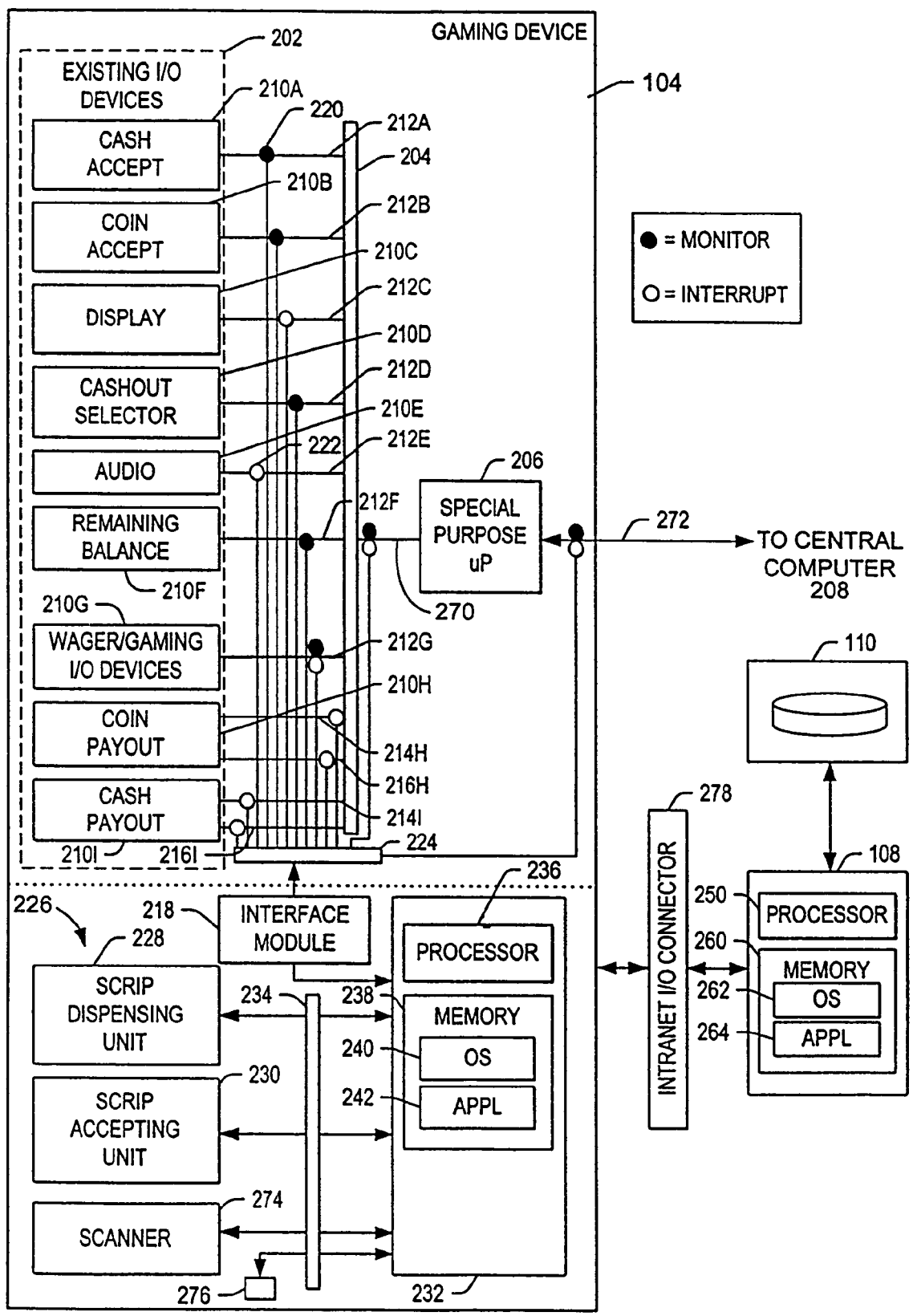
FIG. 2 is a diagram illustrating an exemplary embodiment of a modified gaming device.

FIG. 2 is a diagram presenting an illustrative embodiment of a gaming device 104. Typically, gaming devices 104 comprise a number of existing legacy I/O devices 202, each coupled to one or more legacy microprocessors 206 via I/O bus 204 and existing legacy communication paths 212A-212I (collectively referred to as communication paths 212). Communications between existing I/O devices 202 and the microprocessor 206 can be either serial or parallel. Typically, the microprocessor 206 is a special purpose device designed or programmed for the gaming device 104. Microprocessor 206 accepts user inputs from the existing I/O devices 202 via communication path 270, processes these inputs, and provides outputs to the I/O devices such as the display 212 via communication path 270. Microprocessor 206 is also typically coupled to a central computer 208 via a low speed serial connection 272, and can collect data from the gaming device 104 via the microprocessor. Microprocessor 206 to central computer 208 communications are typically one way (from the microprocessor 206 to the central computer 208).

Existing I/O devices 202 comprise cash acceptor 210 A. This device accepts cash from the user, verifies that the cash is genuine, and relays the denomination accepted to the microprocessor 206 via a cash accept signal on the cash accept communication path 212A. Cash acceptor 210A may comprise a device similar to a currency reader, which can verify the appearance of the printed currency as well as the feel of the paper.

Existing I/O devices 202 also includes a coin acceptor 210B, which accepts coin from the user, verifies that the coin is genuine, and relays the amount and value of the coin accepted to the microprocessor 206 via a coin accept signal on the coin accept communication path 212B. The coin acceptor may be similar to those employed in vending machines in which the size and weight of the deposited coinage is measured. Although the cash acceptor 210A and the coin acceptor 210B are depicted as separate devices, the functionality provided by these devices may be provided by a single integrated device.

Existing I/O devices 202 also comprise a display 210C. Increasingly, display 210C comprises a video display presenting virtually all information conveyed to the user. For example, if the gaming device is a slot machine, the display 210C may show the "reels" to the user, as well as the wager, the amount paid, the amount remaining in the cash-out account, and a variety of other information. Further, display 210C can also be used to accept input to the gaming device 104 by a touch screen or similar pointing device (such as those employed in connection with graphical user interfaces in home computer applications) and to forward the input to the microprocessor 206. The display 210C communicates with the microprocessor 206 using a display signal via a display communication path 212C.

Cash-out selector 210D is usually a simple switch that the user can depress when they are finished using the gaming device 104 and want the machine 104 to pay out the cash-out balance $K_{CO}$ (i.e. the amount remaining in the cash-out account). For example, if the user deposited coin or currency through the cash/coin-accepting devices 210A and 210B in the amount of twenty dollars, the cash-out balance begins at twenty dollars, and is increased or decreased thereafter according to the results of the game played. The cash-out selector 210 provides a cash-out command or signal to the microprocessor 206 via the cash-out communications link 212D.

Audio device 210E accepts an audio signal on the audio communications link 212E from the microprocessor 206. Typically, the audio device 210E is a simple loudspeaker. However, the audio device 210E may also include a microphone or a special purpose processor coupled to a piezoelectric transducer. If desired, a video device can also be utilized to view the area around the gaming device. This can be used to prevent theft or to verify authorized payouts.

Remaining balance indicator 212F shows the user the cash-out balance according to the cash-out balance signal provided on the cash-out balance communications link 212F. This I/O device could be an LED display or similar device. The function of this device may alternatively be performed by the display 210F itself.

Wager/gaming I/O devices (WGDs) 210G include a number of user controls that allow the user to play the gaming device. In the case of a draw poker gaming device 104, the WGDs 201G may include buttons selecting the cards to draw or hold, a button for selecting a new game, a button for determining the wager for each hand played, or other buttons. Similar buttons would be employed with a blackjack gaming device or a slot machine.

Coin payout device 210H pays coin or tokens to the user based upon their winnings in accordance with a coin payout quantity signal on the coin payout quantity communication path 216H. In most circumstances, the present invention minimizes the use of this device because payouts may be provided at least in part in the form of scrip, instead of coin.

The coin payout device 210H can be activated and deactivated according to a coin payout enable signal provided on a coin payout enable communication path 214H. This prevents inadvertent dispensing of coin or cash by disabling the coin payout device 210H until it is time for the payout to occur. In many gaming devices, the power wire to the coin payout device 210 can be used for a coin payout device enable communication path 214H. In such cases, the coin/cash payout device can be activated and deactivated simply by applying or removing power to the power wire. This can be accomplished with a suitable relay or semiconductor switch, preferably under control of the dispensing device computer 232.

Similarly, the cash payout device 210I pays cash to the user based upon their winnings in accordance with a cash payout quantity signal on a cash payout quantity communication path 216I. The cash payout device 210 can be activated and deactivated according to a cash payout enable signal provided on a cash payout enable communication path 214I.

A scrip dispensing device 226 is communicatively coupled to the gaming device 104. The scrip dispensing device 226 comprises a scrip dispensing unit 228 and a scrip-accepting unit 230. The scrip dispensing unit 228 and the scrip-accepting unit 230 can be distinct devices or both scrip dispensing and scrip accepting functions may be performed by a single scrip accepting/dispensing device.

The scrip-dispensing unit 228 dispenses scrip in accordance with commands from the scrip dispensing device computing device or local computer 232. Similarly, the scrip-accepting unit 230 accepts scrip dispensed from any one of the gaming devices 104 in the gaming system 100. The scrip-dispensing unit 228 and the scrip-accepting unit 230 are operatively coupled to the local computer 232 via bus 234, which may be either parallel or serial, or a combination of both.

The scrip dispensing unit device computer 232 can be advantageously selected as an off-the-shelf processor assembly, comprising a processor 236, memory 238 tangibly embodying instructions which comprise an operating system 240 and one or more applications 242. Further, the operating system 240 and the applications 242 are comprised of instructions which, when read and executed by the computer processor 236, causes the scrip dispensing unit device computer 232 to perform the steps necessary to implement and/or use the present invention. Application 242 and/or operating system 240 instructions may also be tangibly embodied in memory 238 and/or data communications devices, thereby making a computer program product or article of manufacture according to the invention. As such, the terms "article of manufacture" and "computer program product" as used herein are intended to encompass a computer program accessible from any computer readable device or media.

In one embodiment, the operating system of the scrip dispensing unit device computer is the popular LINUX, WINDOWS, WINDOWS 95/98, WINDOWS NT, or WINDOWS CE operating system. Since the computational requirements of the scrip unit device computer 232 are reasonably simple, the operating system and associated hardware can be similar to or compliant with hand-held computing systems using the WINDOWS CE operating system. Processor 236 may also advantageously comprise a reduced instruction set computer (RISC) processor. This embodiment has the particular advantage of increasing the functionality provided by the scrip dispensing device 226, since data and functional selection can be performed using standard off-the-shelf intranet or other networking hardware and software.

The scrip dispensing device computer 236 is also operatively coupled to a transducer. In one embodiment, the transducer is a scanner and cannot write or erase information from the scrip. In another embodiment, the transducer is a scanner/recorder 274 that can record, read, and erase codes on the scrip under control of the local computer 232 the central computer 208, or a remote computer such as the intranet server 108. In one embodiment, each scrip comprises a strip with a magnetic strip, and the scanner/recorder 274 is capable of recording, reading, and erasing magnetically manifested codes from the magnetic strip on the scrip.

Such embodiments are particularly useful because, unlike prior devices, they permit the erasure of the information on the magnetic strip and permit the re-distribution and re-use of scrip that is issued by other gaming machines. The re-distribution of scrip makes it economically feasible to improve the quality of the issued scrip, and reduces the cost of emptying machines with excessive scrip.

In one embodiment, the scrip dispensing device computer 236 is also operatively coupled to an infrared signal transmitter/receiver 276. The transmitter/receiver 276 allows wireless, infrared transmissions between external devices such as a personal data assistant (PDA) or a laptop computer and the scrip dispensing device computer 236. In one embodiment, this is implemented with an IrDA port having an IrDA serial IR physical layer. An Infrared Link Access Protocol (IrLAP) is used for a data link protocol, and an Infrared Link Management Protocol (IrLMP) is used to implement handshaking and multiplexing of multiple data streams.

The scrip dispensing device computer 236 is operatively coupled to a remote computer via a connector 278. In one embodiment, the scrip dispensing computer 236 is communicatively coupled to an intranet server 108 via intranet connector 278 communications link 106. The intranet server 108 comprises an intranet server processor 250 and memory 260 storing instructions for the operating system 262 and any applications 264. intranet computer 108 may also be operatively coupled to a data manager 110, and may be operatively coupled to the central computer 208 as well. Alternatively, some or all of the storage and functions provided by the data manager 110 may be implemented in the intranet server 108. The intranet server 108 may also be coupled to the central computer 208 to implement legacy functions. Also, a single computer can be used to implement all of the functionality of the intranet server 108 and the central computer 208.

In one embodiment of the present invention, the scrip dispensing device computer 232 obtains the information required to dispense, manage, and accept scrip by essentially tapping into the communication links 212 between the existing I/O devices and the microprocessor 206. With these connections, the scrip dispensing device 226 can determine when cash or coin is accepted by the gaming device 104, the amount of cash or coin accepted, when cash-out is selected by the user, the balance of the cash-out account, wager and other gaming inputs, and the amount paid out to the user. This information is useful in performing the scrip distribution, and acceptance functions, but is useful also in providing statistical and other information to the owner of the gaming system 100 regarding gaming device 104 usage and other information. This embodiment allows the scrip-dispensing device 226 to be incorporated with a wide variety of gaming devices 104 with minor modification by patching into the existing I/O devices 202.

Information from the existing I/O devices 202 is provided to the dispensing device computer 232 via an interface module 218 and gaming device I/O bus 224.

In one embodiment, the gaming device I/O bus 224 is a low level interface bus, and the interface module is communicatively coupled to requisite existing I/O devices 210A-210I in the following ways.

First, the interface module 218 (through a low level interface bus 224) may be coupled to any of the communications links 212 via a signal monitoring device 220. This device monitors the signal being passed in the communication link 212, but does not interrupt or otherwise alter the signal content. In one embodiment, the signal monitoring device 220 is a small coil, placed around the communication link 212 to detect current flowing through the communication link 212. This allows the scrip dispensing device computer 232 to monitor the signal, but does not allow the scrip dispensing device computer 232 to alter the signal.

Second, the interface module 218 may be coupled to any of the communication links 212 via a signal interrupting and/or substitution device 222. This device, which operates under the control of the local computer 232 and/or the interface module 218, breaks the communication link 212 between its associated existing I/O device 202 and the microprocessor 206, and provides the signal on the communications link 212 to the local computer 232. This allows the local computer 232 to modify the signal before providing it to its ultimate destination, or to substitute an entirely new signal. Of course, the local computer 232 can also provide the original signal to the existing I/O device 202 as well.

For example, suppose an important announcement must be made in the casino. Typically, the microprocessor 206 in each of the gaming device 104 is providing an audio signal to the audio device 210E, for purposes of game play. Taken together, the audio output of a number of gaming devices 104 can be loud enough to prevent the announcement from being heard. Instead of increasing the volume of the public address system to overcome the din of all of the gaming machines, the present invention allows the audio signal normally provided from the microprocessor 206 to the audio device (game play audio) to be interrupted and/or diverted to the local computer 232. This allows the silencing the audio device 210. Further, using a suitable signal from the intranet computer 108 to the local computer 232 of selected gaming devices, this technique can be used to silence the audio signal at any particular gaming device 104, a bank of gaming devices 102, or all of the gaming devices in the gaming system 100.

The local computer 232 may provide a substitute signal to the audio device 210E instead of the game play audio. This substitute signal can be a processed *.wav file or other computer file containing audio information. The substitute signal can be stored in the scrip dispensing device computer 232 memory 238, or obtained from the intranet server 108 via intranet connectivity 278. In one embodiment of the present invention, the audio signal is interrupted and routed to the scrip dispensing device computer, where it is reduced in intensity, and mixed with audio data (such as a verbal announcement) from the intranet server 108. In this way, game play audio can continue, but at an abated level, so that the announcement may be heard. This feature can also be used to provide other aural information to the user. For example, if a particular bank 102 of gaming devices 104 has entered a bonus play situation, this fact can be announced with the audio device 210E or the display 210C. The foregoing ability to monitor and/or interrupt the signals from the existing I/O devices 202 to the microprocessor 206 (as indicated by the circled "M" and "I" indicators in FIG. 2) also allows the operation of the scrip dispensing unit 228 with the coin payout device 210H. The interface module 218 monitors the cash-out signal on the cash-out communications link 212D, and provides the monitored signal to the scrip dispensing device computer 232. When the user decides to cash-out, the cash-out selector 210D is selected, and a signal is sent to the microprocessor 206. Ordinarily, the microprocessor 206 would activate the coin payout device 210H with the coin payout enable signal to activate the coin payout device 210, and provide a coin payout quantity signal to indicate the number of coins to be dispensed (typically, the cash-out balance). The coin payout device 210 would then dispense the required number of coins. The present invention interrupts the coin payout enable communications link 214H to prevent coins from being dispersed, computes the value or number of scrip and the number of coin to be dispensed, and provides a substitute payout quantity signal to the coin payout device 210H.

The ability to monitor or interrupt the signals from the existing I/O devices 202 to the microprocessor 206 also allows the capabilities of the gaming device 104 to be greatly expanded or altered. Signals from the coin accept device 210A can be monitored to keep track of how many coins have been entered into the gaming machine 104. This number can be reported directly to the intranet computer 108, or accumulated in the local computer memory 238, and reported to the intranet computer 108 when requested, or when the number of accumulated coins is above or below a particular amount. Information from the coin accept device 210B or the cash accept device 210A can be used to determine whether the machine is frequently used, indicating that it is either a popular machine type, or placed in a popular location. Statistics correlating the machine type with the location can be used to determine the best location gaming devices 104. Statistics can also be used to determine which gaming devices have faulty coin/cash accept or coin/cash payout devices.

In one embodiment of the present invention, the I/O bus communication path 270 between the I/O bus 204 and the microprocessor 206 and the serial communications path 272 to the central computer 208 can be monitored or interrupted. This embodiment permits the function of the special purpose microprocessor to be monitored, altered, or bypassed entirely. Also, the scrip dispensing device computer 232 could interface directly with the microprocessor 206, or the functions performed by the scrip dispensing device computer 232 could be performed by the microprocessor 206 itself. Further, the scrip-dispensing device 226 can be housed in the gaming device 104, or may be physically separated from the gaming device 104, so long as the communication provided by the gaming device I/O bus 224 is provided.

Many current gaming machines operate by exchanging currency for a number of credits in a payout account. The player may then choose to have winnings credited to the payout account, and losses debited from that account. This reduces unnecessary coin flow through the gaming machine.

The present invention can be practiced in several embodiments. In a first embodiment, when the user elects to cash-out, the user is given a single unit of scrip with a value equal to the entire cash-out value. In this embodiment, the bar code on the next scrip unit in the scrip dispensing unit is scanned and transmitted to the intranet server 108. The intranet server 108 stores the bar code information and associates the stored bar code information with a cash-out value. When the user inserts the dispensed scrip into another machine, the bar code is scanned, and transmitted to the intranet server 108. The cash-out value associated with the bar code is determined, and transmitted to the scrip dispensing device computer 232. The scrip dispensing device computer 232 determines the number of credits to be awarded, and, using the interface module 218, provides one or more coin accept signals on the coin accept communication path 212B as required to provide the required number of credits.

In a second embodiment, when the user elects to cash-out, the player is provided with a combination of scrip (which may be one or more individual scrip units) and one or more coins/tokens. In this embodiment, when a cash-out signal is detected, the coin payout device 210H is deactivated by interrupting the coin payout enable signal and the coin payout quantity signal. A computation is performed to determine how much of the cash-out value will be dispersed in scrip and how much will be dispersed in coin. After this determination is made, the appropriate number of coins are dispensed by providing a substituted coin payout quantity signal, and a coin payout enable signal to the coin payout device 210H. The appropriate value of scrip is then dispensed by dispensing one or more scrip cards. The bar code of each scrip card is scanned, and the information obtained therefrom is then provided to the intranet server 108 before the scrip is dispensed. Each unit of scrip may have a pre-assigned value (in which case more than one scrip unit may be required, but the value of the scrip to be dispensed need not be stored in the database), or may be assigned in accordance with the cash-out balance.

Figure 3:
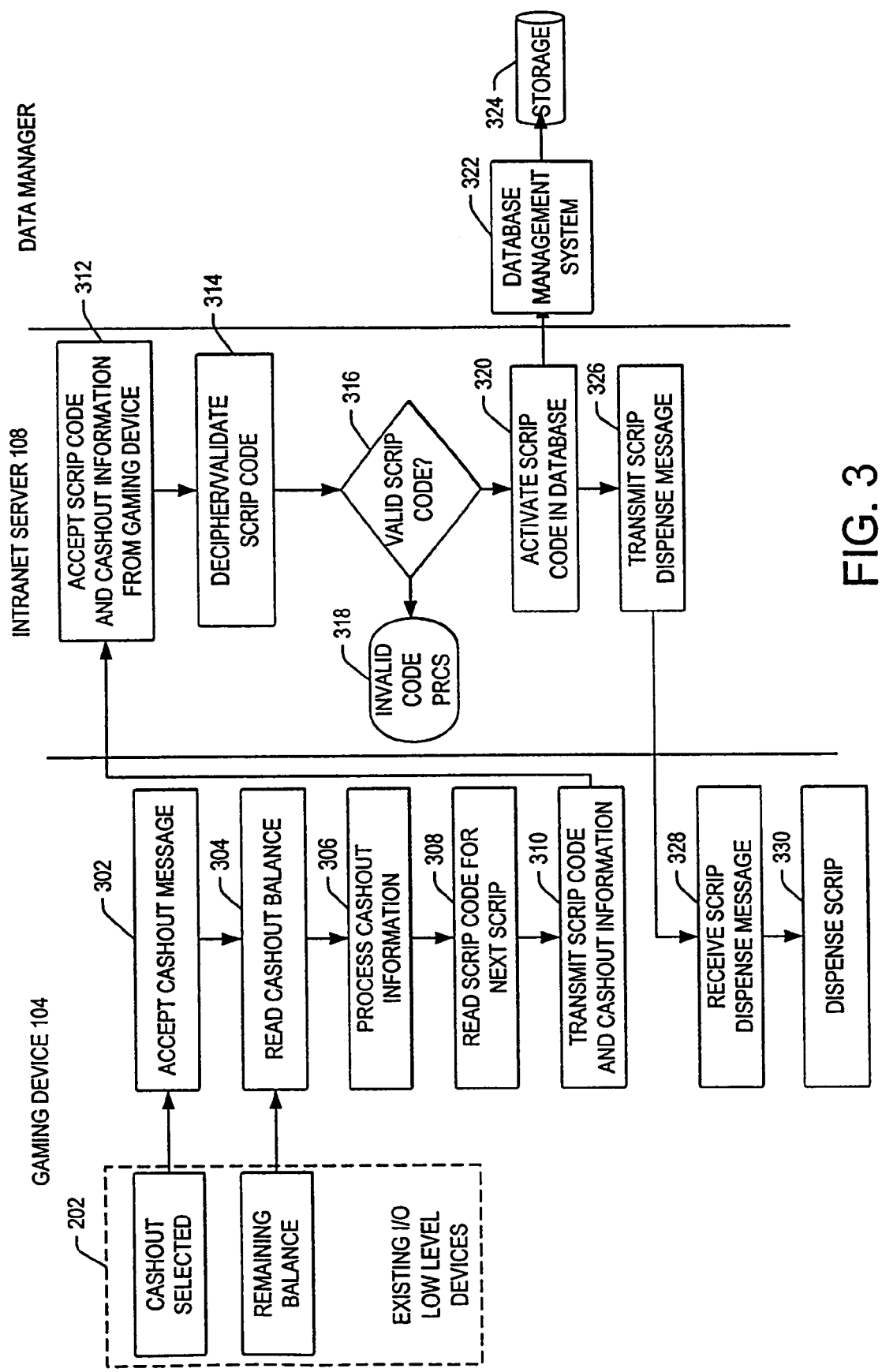
FIG. 3 is a diagram showing an illustrative embodiment of the operations performed in obtaining scrip from the gaming device.

FIG. 3 is a flow diagram illustrating the first embodiment described above. When the player has completed playing the machine, and decides to cash-out the credits in the payout account, the user activates cash-out I/O device 210D. Through the interface module 218 and the signal interrupting and/or substitution device 222, the local computer 232 monitors and accepts 302 the cash-out message. The local computer 232 then reads 304 the cash-out balance from the remaining balance I/O device 210F, and processes 306 the cash-out information. The cash-out information includes the cash-out balance, but may also include other information about the user's gaming patters or history, gaming device 104, diagnostic, security, or other information.

After the user selects the cash-out I/O device 210D, the scrip dispensing unit 228 reads 308 scans a scrip unit or scrip card to read a pre-coded scrip code. The code uniquely identifies each scrip unit. The scrip dispensing device computer 236 transmits the scrip code (and any other information) to the intranet server 108 or other remote computer.

Scrip dispensing unit 228 holds a plurality of scrip cards, each of which has a pre-coded scrip code. The scrip code may be a visibly manifested bar code representing a variable with multiple characters. Alternatively, the scrip code may be a magnetically manifested code on a magnetic strip on the scrip.

In one embodiment, the scrip code is a 20 character variable. The first three characters designate casino, the next 11 alphanumeric characters are a unique scrip card code designating the scrip card number. The next three characters are security characters used to decode the scrip card code to assure that it is genuine. This is accomplished by establishing a predictable relationship between the scrip card code and the three-digit number. Algorithms suitable for testing this predictable relationship are securely stored in the intranet server 108 or the data manager 110, and read when necessary to validate the scrip card code. For example, assume that the scrip card code is the eleven digit number "91234567890." An algorithm can be defined wherein the security characters are the result of the following relationship:

$$SecurityCode = \left[ frc\left(\pi + \frac{91234567890}{99999999999}\right)^5 \right] \quad (1)$$

Without knowledge of the foregoing equation, the relationship between the security code and the scrip card code will appear to be an unpredictable random number. However, when the intranet server 108 performs the foregoing computation, the security code on the scrip card can be verified. Other private key encryption techniques are also possible. Further, it may be advantageous to change the seed value (represented by the character π in the above equation) at regularly scheduled intervals, either randomly, or according to a predefined relationship. The last three characters in the scrip code are used to perform checksum operations to reduce errors.

Next, the intranet server 108 accepts the message with the scrip code and optional cash-out information. The scrip code is then deciphered and validated 314. This can be accomplished with private or public key information stored in the intranet server 108, or the data manager 110. If the deciphering indicates that the scrip code is a valid code, the scrip code is activated. This is shown in blocks 316 and 320. The scrip code may be activated by storing a flag associated with the code stored in the data manager 110, or can be accomplished by storing the code itself in the data manager. After the scrip code is activated, a scrip dispense message is sent 326 to the gaming device 104. The gaming device 104 receives 328 this message, and dispenses 330 the scrip card.

Many gaming machines give the player the option of issuing all winnings in coin, an option that can rapidly exhaust the coin cache in the gaming machine. To obviate this problem, provision may be made in the foregoing for logic to prevent coin payouts below or above a certain amount. Provision may also be made to issue payouts in a combination of scrip cards and coin.

Given the foregoing teaching, it is apparent that the scrip code read from the scrip card may be read with an optical, magnetic, or other type of reader as the scrip card is expelled from the scrip dispensing unit 228. However, the foregoing process of reading the scrip card, verifying the code and activating the code before disbursal to the user is preferred because it prevents the user from interfering with the reader by prematurely pulling the scrip card, and it prevents passing anything to the user until after it is assured that the issued scrip card is valid. For example, it is preferable to discover a printing error or other defect in the pre-printed scrip card before disbursal.

Figure 4:
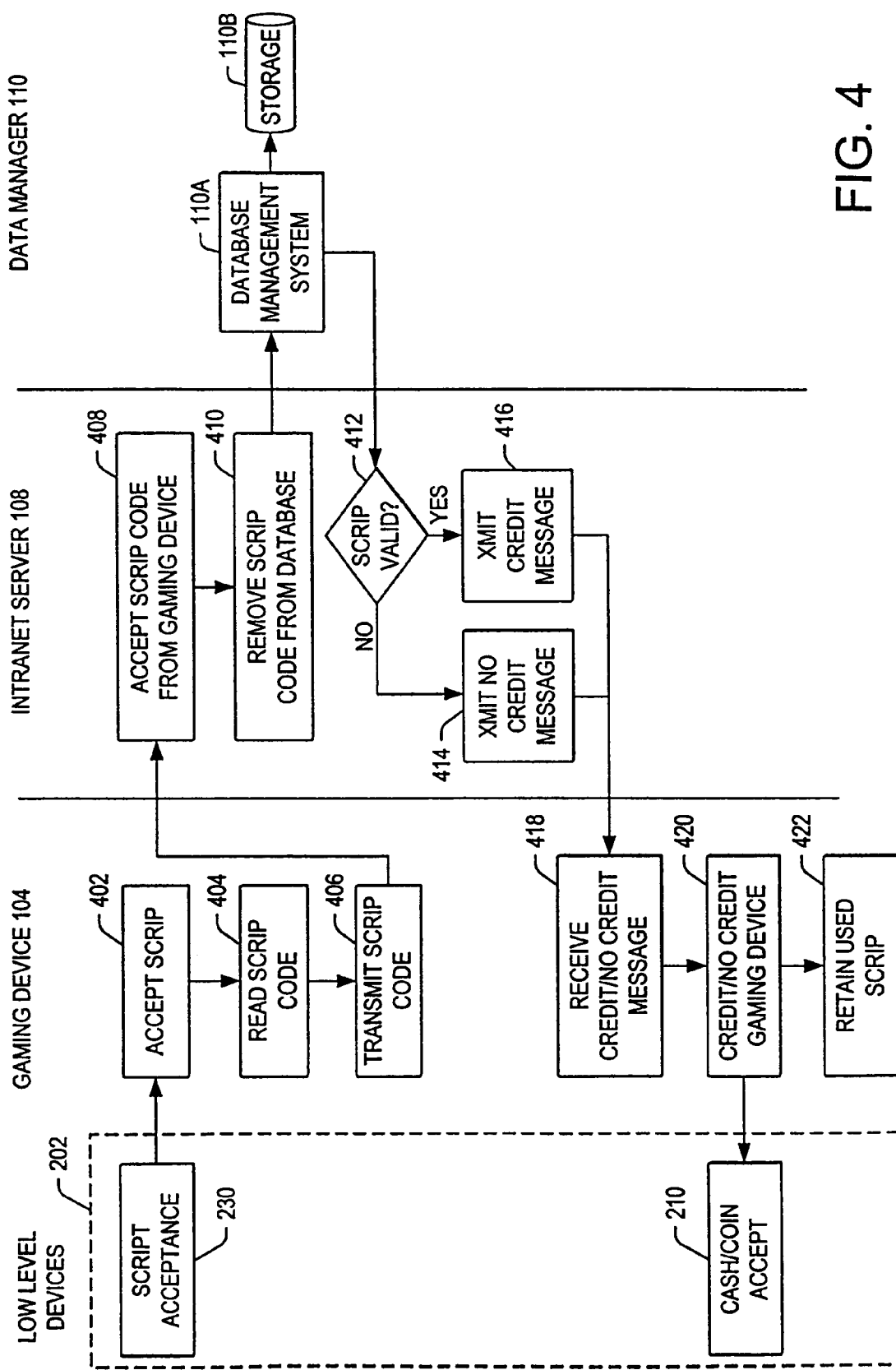
FIG. 4 is a diagram showing an illustrative embodiment of the operations performed in using scrip issued from a gaming device.

FIG. 4 is a flow diagram showing exemplary operations performed in using scrip cards issued from the gaming device as described in FIG. 3. First, the user inserts the dispensed scrip into the scrip-accepting unit 230. A scrip code reader inside the scrip accepting unit 230 accepts 402 and reads 404 the scrip card code, and transmits the scrip code 406 to the intranet server 108. The intranet server 108 receives 408 the scrip code message (as well as any other information that is passed along by the gaming device 104) and verifies that the scrip code is valid by deciphering the scrip card code with the security characters as described above in reference to FIG. 3. If the card is valid, the value or credits associated with the scrip code is read, and the scrip code is removed 410 from the database, or a flag or other data is written to the database to indicate that the scrip card with the received code is no longer active. If the scrip units do not have a predetermined value, a message indicating the value of the scrip card is also sent from the intranet server 108 to the gaming device 104. If the scrip is not valid 412, a no credit message is sent to the gaming device 104. Otherwise, a credit message is received 418 by the gaming device 104 and the user is credited 420 the appropriate amount. In one embodiment, this is accomplished via appropriate cash/coin acceptance device 210 (which will be detected at the processor 206 as if they were received directly from the device). The (now) used scrip card is then retained in the gaming device 104. These used scrip cards can then be used by the hosting casino to keep track of gaming device 104 receipts Scrip accepting unit 230 may be a special purpose device dedicated to reading the scrip card codes, or may be a modified cash/coin acceptance I/O device. In an embodiment using optical bar codes for the scrip card code, this can be accomplished by integrating a simple optical reader in a cash/coin acceptance device.

If desired, the communications between the gaming device 104 and the intranet server 108 (and, or that matter, the intranet server 108 and the data manager 110 can be secured using private and/or public key encryption techniques. This helps prevent users from monitoring and/or interrupting the gaming device 104/intranet server 108 interface to issue bogus scrip.

Figure 5:
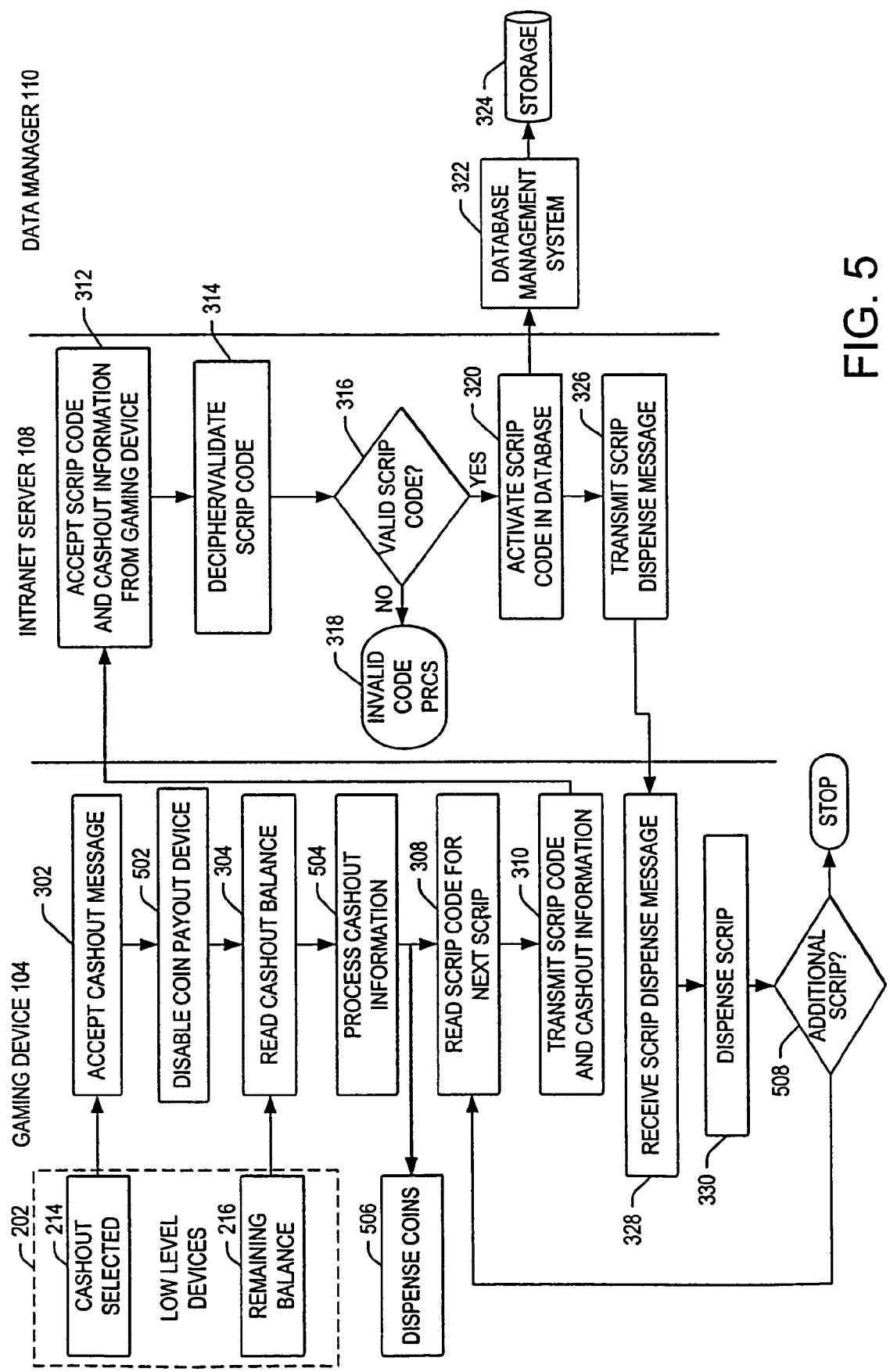
FIG. 5 is a diagram showing a second illustrative embodiment of the operations performed in obtaining scrip issued from a gaming device.

FIG. 5 is a flow chart illustrating the second embodiment described above, in which upon cash-out selection, the player is provided with a combination of scrip and one or more coins/tokens. When the player has completed playing the machine, and decides to cash-out the credits in the account, the user activates cash-out I/O device 210D. Through the interface module 218 and the signal interrupting and/or substitution device 222, the scrip dispensing unit device computer 232 monitors and accepts 302 the cash-out message. Next, the coin payout device 210H is disabled by interrupting the coin payout enable communication path 214H. This is depicted in block 502. Optionally, the coin payout quantity signal, which describes the number of coins to be dispensed, can also be interrupted. The scrip dispensing unit device computer 232 then reads 304 the cash-out value $K_{CO}$ from the remaining balance I/O device 210F, and processes 306 the cash-out information to compute the number of scrip units to be dispensed by the scrip dispensing unit 228 and the number of coins to be dispensed by the coin payout device 210H.

Where scrip units have a pre-determined scrip value $K_S$, multiple scrip units and multiple coins/tokens may be dispensed. In this situation, the number of scrip units m to be dispensed is computed according to the following relationship $$K_{CO}=mK_S+K_{rem} \quad (2)$$

wherein m is the largest positive integer satisfying the above relationship, $K_S$ is a positive number representing the scrip value, and $K_{rem}$ is a positive number representing the remainder of the cash-out value. The remainder cash-out value $K_{rem}$ is then used to determine an equivalent number of coins/tokens to be dispensed. A signal or message indicative of this number is supplied to the coin payout device 210H as a substituted coin payout quantity signal on the coin payout quantity communication path 216H. In one embodiment of the present invention the payout quantity signal is a series of pulses indicating the number of coins to be dispensed. The coin payout enable signal (which was interrupted or disabled in operation 502 above) is then provided to activate the coin payout device 210H. At this time, the coin payout device 210H begins dispensing coins having a cumulative value of $K_{rem}$.

Before, during or after the foregoing operations, the scrip dispensing unit 228 scans 308 a scrip unit or scrip card to read a pre-coded scrip code. The scrip code uniquely identifies each scrip card. The scrip dispensing device computer 236 transmits the scrip code (and any other information) to the intranet server 108 or other remote computer.

Next, the intranet server 108 accepts the message with the scrip code and cash-out information including the cash-out value. The scrip code is then deciphered and validated 314. If the deciphering indicates that the scrip code is a valid code, the scrip code is activated by sending an appropriate message to the data management system 322 for storage 324. This is shown in blocks 316 and 320. The scrip code may be activated by storing a flag associated with the code stored in the data manager 110, or can be accomplished by storing the code itself in the data manager. After the scrip code is activated, a scrip dispense message is sent 326 to the gaming device 104. The gaming device 104 receives 328 this message, and dispenses 330 the scrip card.

As described above, in this embodiment of the invention, the scrip value $K_S$ and the cash-out value $K_{CO}$ may require more than one scrip unit (m>1) to be dispensed Block 508 determines whether additional scrip cards must be dispensed. If so, the scrip dispensing unit 228 reads the scrip code for the next scrip card, and the foregoing steps are performed again. This process is repeated until all of the required scrip units have been dispensed. In one embodiment, this can be accomplished by determining a decremented the cash-out value $K_{CO}'$ as $K_{CO}-K_S$ each time a scrip card is dispensed, and repeatedly dispensing scrip and decrementing the cash-out value until $K_{CO}' \mu K_S$.

In the embodiment described above, a cash-out balance signal 212F was available from the remaining balance I/O device 210F. In some cases, the remaining balance is indicated by a plurality of light emitting diode (LED) elements driven by either separate wires, or by a simple parallel interface. In such cases, the cash-out balance can be determined merely by monitoring which LED segments are activated, or by reading signals on the parallel interface. However, increasingly, the cash-out balance and many other game play parameters are displayed to the user on a cathode ray tube (CRT) display. Although it is theoretically possible to retrieve the cash-out balance from the CRT, it would generally be prohibitively expensive to do so. Consequently, an alternative embodiment of the present invention also utilizes a unique method for determining the cash-out balance.

As described above, some payout devices 210H and 210I operate with a payout enable signal provided on a payout enable communication path 214H and 214L and a payout quantity signal provided on a payout quantity signal path 216H and 216I, respectively. The payout enable communication path may be a line connecting a 100V power source to the payout device, a line connecting a 20V power source or a logical signal.

In some cases, the payout quantity signal is an analog or a digital signal provided by the microprocessor 206 whose characteristics describe the number of units to be paid out. Digital signals can comprise a series of pulses, one for unit to be dispensed, or other signal. In such cases, after the user elects to cash-out, the payout enable signal is interrupted, and the cash-out value is simply read off of the appropriate payout quantity communication links 216H and 216I.

In other cases, the payout device dispenses coins under direct control of a device controller such as the microprocessor 206. When the user elects to cash-out, the microprocessor 206 enables the coin payout device 210H, which begins dispensing coins. Each time a coin is dispensed, the coin payout device transmits a coin payout quantity signal (in this case, a pulse) to the microprocessor 206 over the coin payout quantity communication path 216H. This is ordinarily accomplished via a microswitch in the coin payout device 210H. The microprocessor 206, which has access to the cash-out balance, decrements the cash-out balance by one coin each time a coin is dispensed by the coin payout device 210H. When the cash-out balance has been decremented to zero, the microprocessor 206 disables the coin payout device 210H by suitably changing the payout enable signal 214H.

To accommodate this sort of design, one embodiment of the present invention operates as follows. The cash-out communications link 212D is monitored. When a cash-out signal is detected, the enable signal between the microprocessor 206 and the payout device 210 is interrupted. The payout quantity signal on the payout quantity communications path 214H is also interrupted. In its place, the local computer 232 provides a substitute payout quantity signal (another series of pulses) and monitors the enable signal from the microprocessor 206. The processor continues to provide this payout quantity signal until the state of the enable signal changes. Each time that a payout quantity signal pulse is provided to the microprocessor 206, a counter in the local computer 232 is incremented. When the state of the enable signal changes, the counter in the local computer indicates the cash-out value (number of credits). Then, this number is used to determine the number of coins and the number of scrip cards to be dispensed to the user. This can be accomplished using the mathematical relationships described above. Alternatively, this can be accomplished by providing a substituted payout quantity signal to the microprocessor 206. A check is made to determine if the number of payout quantity signals provided is $mK_s$ wherein m is a positive integer. If this is the case, then a dispense signal is provided to the scrip dispensing unit 228 to dispense a scrip card. Then, the number of substituted payout quantity signals is incremented, and the foregoing operations repeated until the monitored enable signal from the first device controller is disabled. This indicates that a sufficient number of payout quantity signal has been provided to account for the cash-out balance. Next, the interrupted enable signal is provided to the coin payout device 210H, and the coin payout quantity communication path 216H is monitored. When the number of pulses describes a number equivalent to the difference between incremented number of substituted payout quality pulses that were provided to the microprocessor and $mK_s$, a sufficient number of coins have been dispensed, and the enable signal is removed so that no more coins are dispensed.

Figure 6:
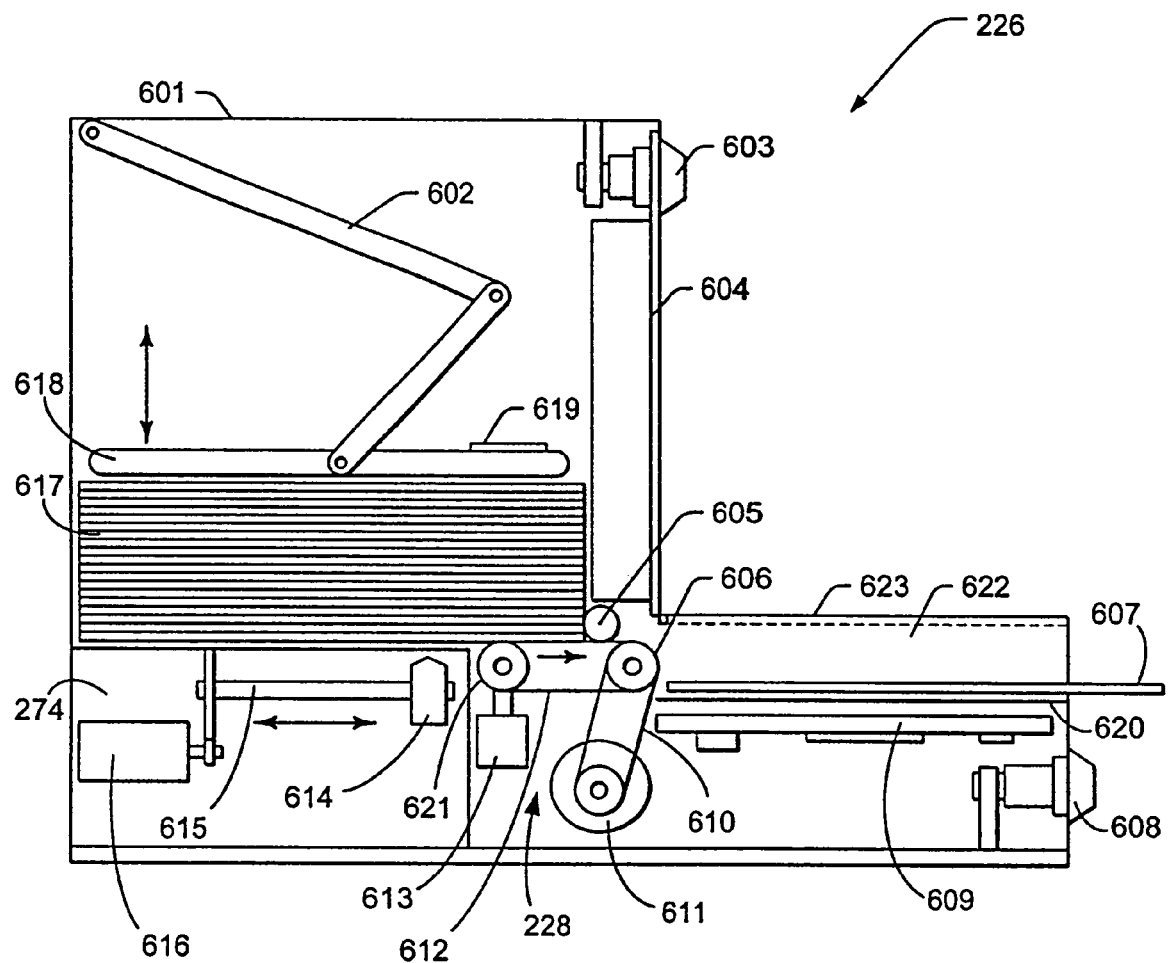
FIG. 6 is a diagram showing a schematic view of exemplary embodiment of the scrip-dispensing device.

FIG. 6 presents a side view of one embodiment of the scrip-dispensing device 226. The scrip-dispensing device 226 comprises a housing 601, which surrounds and protects the device 226. A front door 604 is provided for loading scrip cards in the scrip-dispensing device 226, and a front door lock 603 prevents access by unauthorized personnel. Securing lock 608 secures the scrip-dispensing device 226 to a mounting surface.

To reduce complexity of the feeding mechanism and to minimize space requirements (the scrip-dispensing device 226 is nominally 12" by 9" by 4"), the pre-printed scrip cards 617 are dispensed using gravity. The interior of the scrip-dispensing device 226 can accommodate in the order of one thousand pre-coded scrip cards. To assure sufficient downward force to dispense the coupons, a telescoping or articulating arm 602 coupled to a weight 618 is provided. Weight 618 assures a minimum downward force is applied to the scrip cards 617, even when only a single scrip card remains to be dispensed. Weight 618 includes an adjusting device 519 such as a strip magnet to balance the force urging the scrip cards 617 in a downward direction. When additional scrip cards are added to the scrip-dispensing device 226, the lock 603 is unlocked, the front door 604 is opened, and the door is swung out or removed. Weight 618 is moved to the top of the housing 601, and retained there by the adjusting device 619. In one embodiment, this is accomplished by the use of a ferro-conductive element on the inner surface of the housing 601 and with a strip magnet for the adjusting device 619. After inserting the new scrip cards 617 (with the barcode to be read facing down), the front door 604 is closed and locked 603. In the event that the person adding the new scrip cards 617 neglected to pull the weight 618 down, a wedge or other device operatively coupled to the front door separates the weight from the upper inner surface of the housing.

In one embodiment, the local computer 232 is implemented in a logic PC board 609. When the logic PC board 609 receives a command to dispense a scrip card, the scanner 624 reads the code on the bottom side of the bottom scrip card 760. To accomplish this, drive motor 616 uses translation shaft 615 (such as a screw-threaded shaft) to move optical barcode reader sensor 614 across the scrip barcode to read the scrip code. Information from this process is sent to the logic PC board 609, and eventually forwarded to the intranet computer 108. As described above, if a valid code is read, the scrip dispensing unit 228 then proceeds to dispense the bottom scrip card 760. This is accomplished by activating solenoid 613 and drive motor 611. Solenoid 613 pushes upward on the idler pulley 621, causing the transport belt 612 to make contact with the bottom scrip card 760. Motor 611 provides motive torque to the drive pulley 606 via the drive belt 610. This moves the transport belt 612 in the indicated direction, dispensing the bottom scrip card 760 through channel 622.

In one embodiment, this operation involves translational motion on the part of idler pulley 621, and only rotational motion of the drive pulley 606. In other words, the transport belt 612, idler pulley 621 and drive pulley 606 rotate as a unit clockwise about the drive pulley's longitudinal axis upon activation of the solenoid 613. Once the bottom scrip card 760 has moved sufficiently towards the drive pulley 606, contact between the bottom scrip card 760 and the transport belt 612 near the idler pulley 621 is no longer required, and the solenoid 613 is deactivated. Thereafter, the scrip card is dispensed via contact between the bottom scrip card 760 and the transport belt 612 near the drive pulley 606. If necessary, one or more pinch rollers can be provided near the drive pulley 506 to grip the bottom scrip card 760.

To prevent more than one scrip card from being dispensed at a time, an anti-stripping wheel 605 is provided. The anti-stripping wheel 605 rotates counter clockwise (and therefore counter to the rotation of the transport belt 612), thereby preventing the dispensing of multiple scrip cards.

Dispensed scrip card 607 passes through channel 622 formed between lower shelf 620 and upper shelf 623. The channel and shelf structures prevent damage to the electro-mechanical elements of the scrip-dispensing unit 228. This is important, since the scrip dispensing device 226 particularly when installed externally from the gaming device 104) is subject to spilled liquids and other foreign matter.

Figure 7:
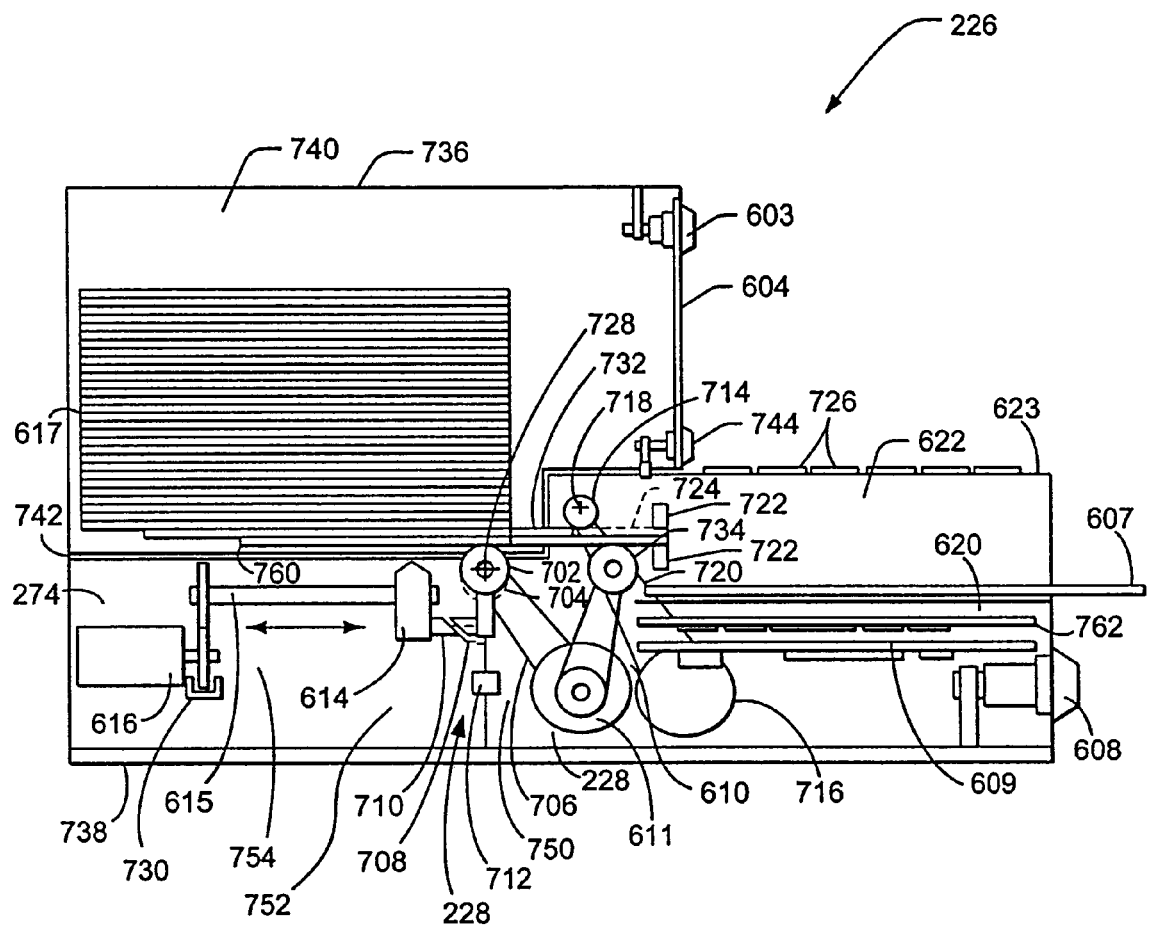
FIG. 7 is a diagram showing a schematic view of a second exemplary embodiment of the scrip dispensing device.

FIG. 7 is a diagram of an alternative embodiment of the scrip dispensing unit and related elements. As can be appreciated, scrip that has been dispensed and inserted into other gaming devices 104 must be periodically replaced. To make this replacement more convenient and more secure, the scrip dispensing device 226 shown in FIG. 7 includes a cassette unit 736 which has an interface 742 adapted for releasable coupling with a scrip dispensing module 738. The scrip dispensing module 738 houses the scanner 274, the scrip dispensing unit 228, the interface module 218 and the local computer 232. The cassette has a plurality of surfaces forming a cavity 740 therein for storing the scrip. The cassette can be secured to the scrip dispensing module 738 by a cassette locking mechanism 744.

The scrip dispensing module 738 comprises one or more engagement wheels 702. These engagement wheels 702 rotate about an engagement wheel axis 728 and are nominally held in a first (non-engagement) position (indicated by dashed lines 704) by a spring 712. However, the engagement wheels 702 can be vertically displaced to a second (engagement) position (shown by solid lines 702) by a force sufficient to overcome the retention force of the spring 712 and the mass of the engagement wheels 702 and related assemblies. The optical barcode reader sensor 614 comprises an extension member 710 which slidably engages a corresponding member 708 physically contacting the engagement wheel assembly 750 when the sensor 614 is disposed proximate to a first position 752, but which does not physically contact the engagement wheel assembly 750 when the sensor 614 is disposed in a position not proximate to the first position 752 (such as second position 754). Slidable coupling between the member 710 and corresponding member 708 vertically displaces the engagement wheel 702 assembly, hence moving the engagement wheel axis 728 from the non-engagement position 704 to the engagement position 702. When in the engagement position, the engagement wheels 702 contact the bottom side of the bottom scrip card 760, and urges the scrip card in a dispensing direction (towards the channel 622).

This design has a number of advantages. First, it eliminates the need for a separate solenoid 613 to move the engagement wheel 702, and all of the logic and circuitry necessary to operate the solenoid 613. It also prevents the engagement wheel 702 from dispensing any scrip 617 until the barcode reader sensor 614 has finished scanning the barcode on the scrip, thus reducing the possibility of prematurely dispensing scrip. Finally, this design also permits more precise control over the precise location of the engagement wheels 702 and the force they apply to the scrip. To control the position of the engagement wheels 702, the motor is augmented with a rotation measuring device 730 such as a shaft encoder. Using the data from the shaft encoder, the precise position of the optical barcode reader sensor (and hence, the engagement wheels) can be ascertained and controlled. This permits the position of the engagement wheels 702 to be varied as desired to assure that the scrip is dispensed with as few errors as possible. It is also possible to vary the position of the engagement wheels to account for different scrip parameters (including thickness and composition), or to account for an estimate of the number of scrip units remaining in the dispenser (and hence the weight on the bottom card 760).

After the engagement wheels 702 make contact with the bottom scrip card 760, motor 611 provides motive torque to the an engagement wheel 702 via the drive belt 706. This moves the scrip in a dispensing direction. Dispensing wheels 734 urge the scrip card into the channel 622.

The foregoing mechanical structure must be capable of reliably dispensing a single scrip unit, regardless of how many scrip units have been loaded into the unit. When a large number of scrip units have been loaded into the scrip dispensing unit, there is the possibility that friction between the bottom scrip card 760 and the card above it 732 will cause more than one scrip card to be translated by the engagement wheel 702. To prevent the unwanted scrip card 732 from being dispensed into the channel 622, a stripper cam 714 is provided. Nominally, the stripper cam 714 rotates about a stripper cam axis 718 in the same direction as the engagement wheels 702 (illustrated in the clockwise direction). However, since the stripper cam is disposed on the opposite side of the scrip card, the stripper cam provides a force tending to urge scrip cards in a retract direction. In one embodiment of the invention, the maximum radial extent of the stripper cam 714 from the stripper cam axis 718 is such that it will not contact a single scrip card being urged in the dispensing direction (towards the channel 622), but will contact the top of a second scrip 732, should one be inadvertently translated by the engagement wheel 702 in the dispensing direction. The exterior surface of the stripper cam 714 can be made of rubber or hard plastic.

In the illustrated embodiment, the stripper cam axis 718 is offset so that the outer surface of the stripper cam 714 intermittently contacts the upper surface of the second scrip 732 to urge it in the retract direction (opposing that of the dispensing direction), and prevent the second scrip from passing by the stripper cam 714.

It is possible that the friction between the second scrip card 732 and the outside surface of the stripper cam 714 will be inadequate to prevent the second scrip card 732 from passing by the stripper cam 714. Even if dispensed, the second scrip card 732 should be useless, since the pre-coded information on the second scrip card 732 has not been read and passed to the intranet server 108 for activation. Nonetheless, to prevent waste and possible jamming of the scrip dispenser, it is desirable to prevent multiple cards from being dispensed.

If the urging force provided by the stripper cam 714 is insufficient to prevent the second scrip card 732 from entering the channel 622, the presence of the scrip card (now referred to as an extended second scrip card 724) will be sensed by a scrip sensor 722. In one embodiment of the present invention, the scrip sensor 722 is an optical sensor, which determines the opacity of the material passing between an irradiating source and a receiver sensor. The measured opacity is monitored by the local computer 232. If the opacity indicates that more than one scrip card is being dispensed, the local computer 232 commands the scrip dispensing unit 228 to self correct by moving the scrip cards (both the bottom card 760 and the second card 732) in a retract direction. This is accomplished by reversing the rotation of the engagement wheels 702 and the dispensing wheels 734. The rotation direction of the stripper cam 714, however, is not reversed, since it is desirable to have the stripper cam 714 continue to urge any scrip in the retract direction. Since the stripper cam 714 must be capable of rotating in either the same direction as the engagement wheels, a second motor 716, which is separately controllable from the first motor 611 is provided. Using the second motor belt 720, the second motor 716 can turn the stripper cam 714 in either the clockwise or the counterclockwise direction, as commanded by the local computer 232. In an alternative embodiment, changes in the direction of the rotation of the stripper cam 714 can be implemented by a simple gear box, or reversing gear.

Dispensed scrip card 607 passes through channel 622 formed between lower shelf 620 and upper shelf 623. After the scrip is distributed, the computer 232 can activate visual display elements 726 to indicate to the user that scrip has been dispensed. Also, using the interface module 218 located on the system I/O (SIO) card 218, the computer 232 may interrupt the signal on the audio communication path 212E, and substitute another signal indicating that the scrip has been dispensed. Alternatively, an audio signal indicating that the scrip has been distributed can be added to the audio signal.

In the illustrated embodiment, the SIO card 762 is physically distinct from the logic PC board 609, which implements the local computer 232. Gaming device 104 design can vary widely from manufacturer to manufacturer, and from year to year. Hence, it is desirable that the gaming machine 104 interface be as flexible as possible. This is accomplished by segmenting the functions of the interface module 218 and the local computer 232 into an SIO card 762 and a physically distinct logic PC board 609. Since a given local computer 232 is typically capable of adapting to a wide variety of devices and I/O interfaces, the same logic PC board 609 can be used for virtually any gaming device 104. At the same time, the SIO card 762 can be designed to include only those elements (isolators, relays, etc) that are needed to interface with each particular gaming device 104. Further, the interface between the SIO card 762, the local computer 232 and other elements can be designed to permit the SIO to be readily installed and removed as required (i.e. plug-in compatibility).

Although it is advantageous to separate the functionality of the local computer 232 and the interface module 218 into physically distinct and removable cards, the present invention can be practiced with a general purpose SIO card 762 that applied to all or virtually all gaming devices. For that matter, the functions performed by the interface module, the local computer 232,and other elements in the scrip dispensing device 226 can be implemented on a single card, if desired.

In another embodiment, a sensor can be placed in the channel 622 to indicate whether the dispensed scrip has been removed. If the sensor indicates that the scrip has not been removed and the gaming machine 104 has remained inactive for a period of time (determined by measuring signals from the existing I/O devices), the local computer 232 may send a message to the intranet computer to categorize the dispensed scrip as unclaimed.

FIG. 8 is a diagram showing one embodiment of the cassette 736. The cassette 736 comprises a first aperture 802 through which the scrip cards are dispensed, and a second aperture 804, which is positioned adjacent the barcode reader sensor 614 so that the barcode reader sensor 614 can scan the bar codes on the downward facing side of the scrip cards. The cassette 736 interface 742 also comprises a unique cassette code 806. In the illustrated embodiment, the cassette code is manifested by a bar code disposed adjacent to the second aperture 804. Under command of the local computer 232, the barcode reader sensor 614 can read the cassette code, and determine which cassette is attached to the scrip dispensing module 738. This information can be relayed to the Internet server 108 for tracking the distribution of scrip in each of the gaming devices 104.

Since the number of scrip cards in the cassette 736 may be in the order of 1000 cards or more, weight placed upon the bottoms scrip card 760 may vary substantially. To reduce this variance, and to permit more predictable dispensing of the scrip cards, one or more of the interior surfaces of the cassette 736 may also comprise modified surface 810 to assist in the dispensing of the scrip cards.

Figure 9B:
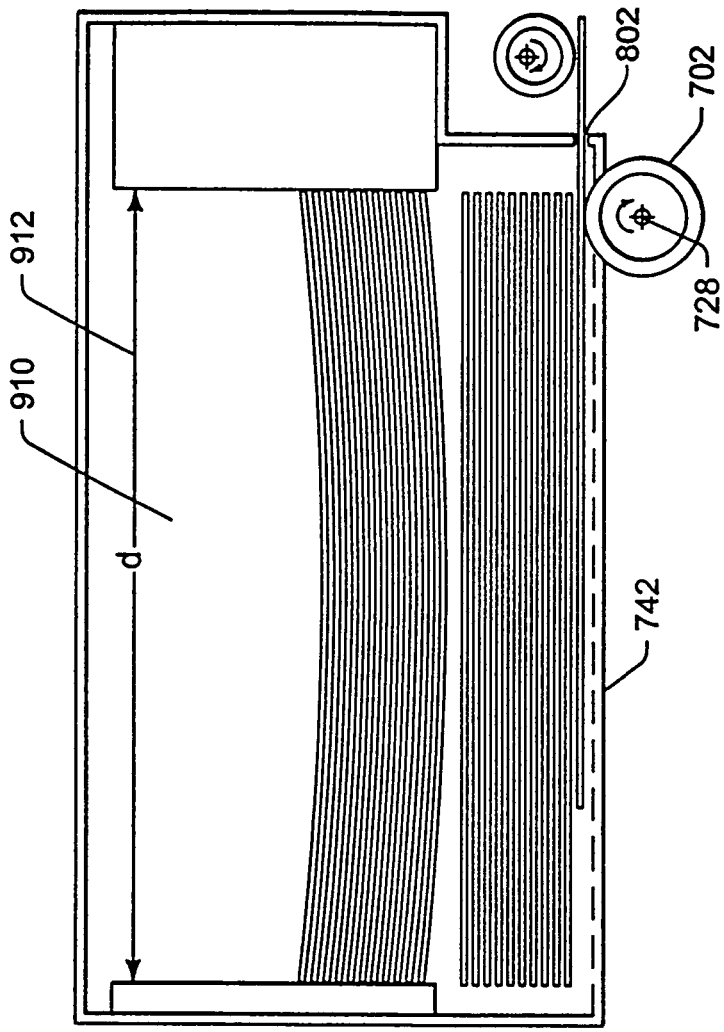
FIGS. 9A and 9B are diagrams showing additional embodiments of the cassette.
Figure 9A:
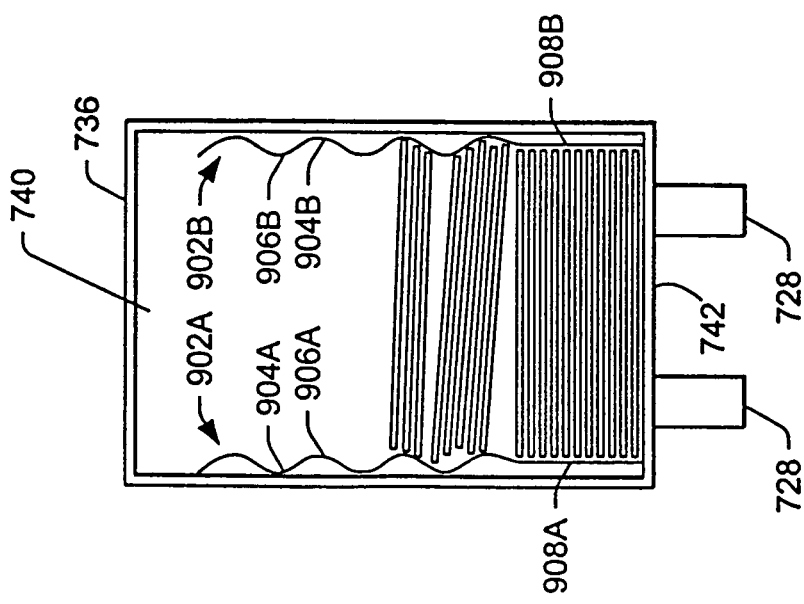

FIG. 9A is a diagram showing one embodiment of the modified surface 810. In this embodiment, the modified surfaces comprise a first vertical interior surface 902A having undulations including a peak undulation 904A and a trough undulation 906A. Opposing the first interior surface 902A on the other side of the scrip cards, is a second vertical interior surface 902B having a undulations including a peak undulation 906B and a trough undulation 904B. In one embodiment, the undulations in the first interior surface 902A and the second interior surface 902B are in phase. That is, the peak undulation 906A of the first interior surface 902A is oppositionally disposed from the trough 906B of the second interior surface 902B. Non-undulating surfaces 909A and 908B are disposed below the undulations in the interior surfaces 902A and 902B, and proximate the interface 742. The foregoing structure relieves some of the weight imposed on the bottom scrip card 760,allowing the scrip cards to be more predictably dispensed one at a time.

FIG. 9B is a diagram showing another embodiment of the modified surface 810. In this embodiment, an upper portion of the cavity 740comprises a narrowed portion 910. The distance from opposing surfaces of the narrowed portion 910is less than the dimension of the scrip card. Hence, the scrip cards bow downwards as shown in FIG. 9B. Friction between the edges of the scrip cards and opposing surfaces of the cavity 740 in the narrowed portion relieve some of the weight applied to the bottom scrip card 760.

FIG. 10 is a diagram illustrating another embodiment of the cassette 736. In this embodiment, guides 1002A-1002D are disposed in the interior surface of the cassette 732. The guides (collectively referred to hereinafter as guides 1002) cooperatively interact with guide pins 1004A-1004D on the weight 618. The lowest extent of the second guide 1002B, disposed nearer to the aperture 802 extends below the lowest extent of the first guide 1002A, which tilts the weight 618 as the last few scrip cards are dispensed. This applies additional weight to the bottom scrip card 760 near the engagement wheel 702.

Additional Embodiments

Figure 11:
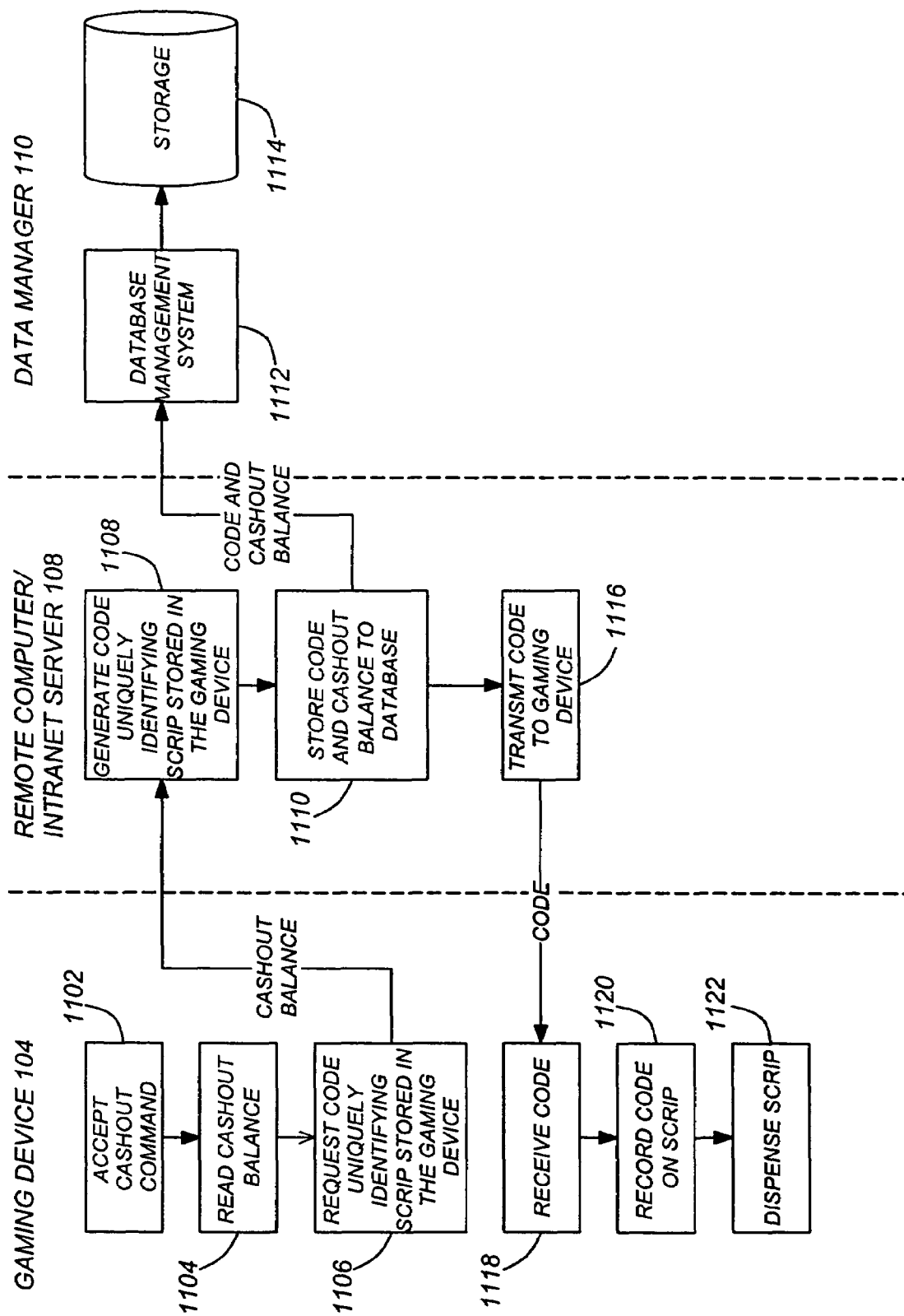
FIGS. 11-13 are flow charts illustrating an alternative embodiment of the present invention in which the scrip need not be pre-coded before insertion into the gaming device for distribution.
Figure 12:
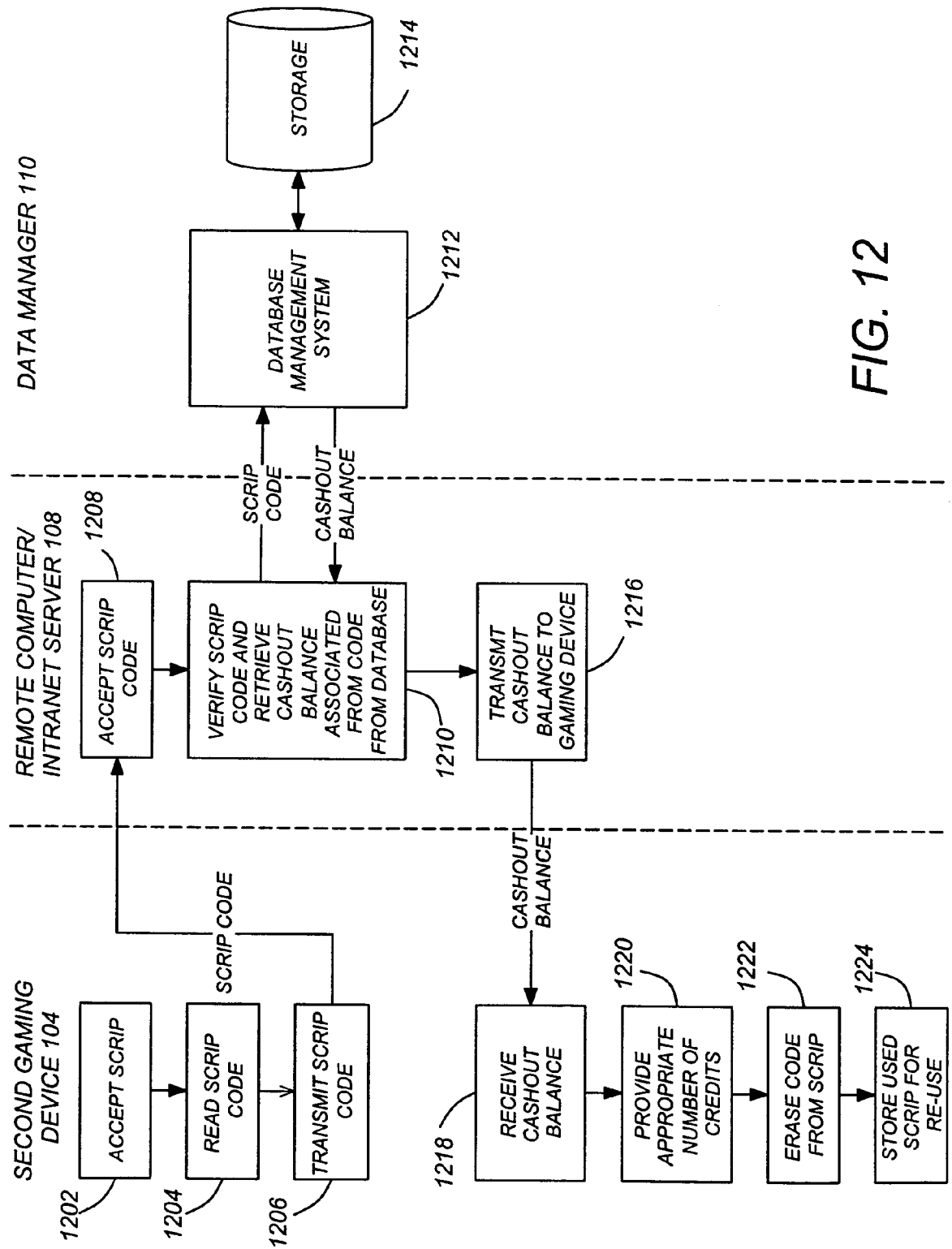
Figure 13:
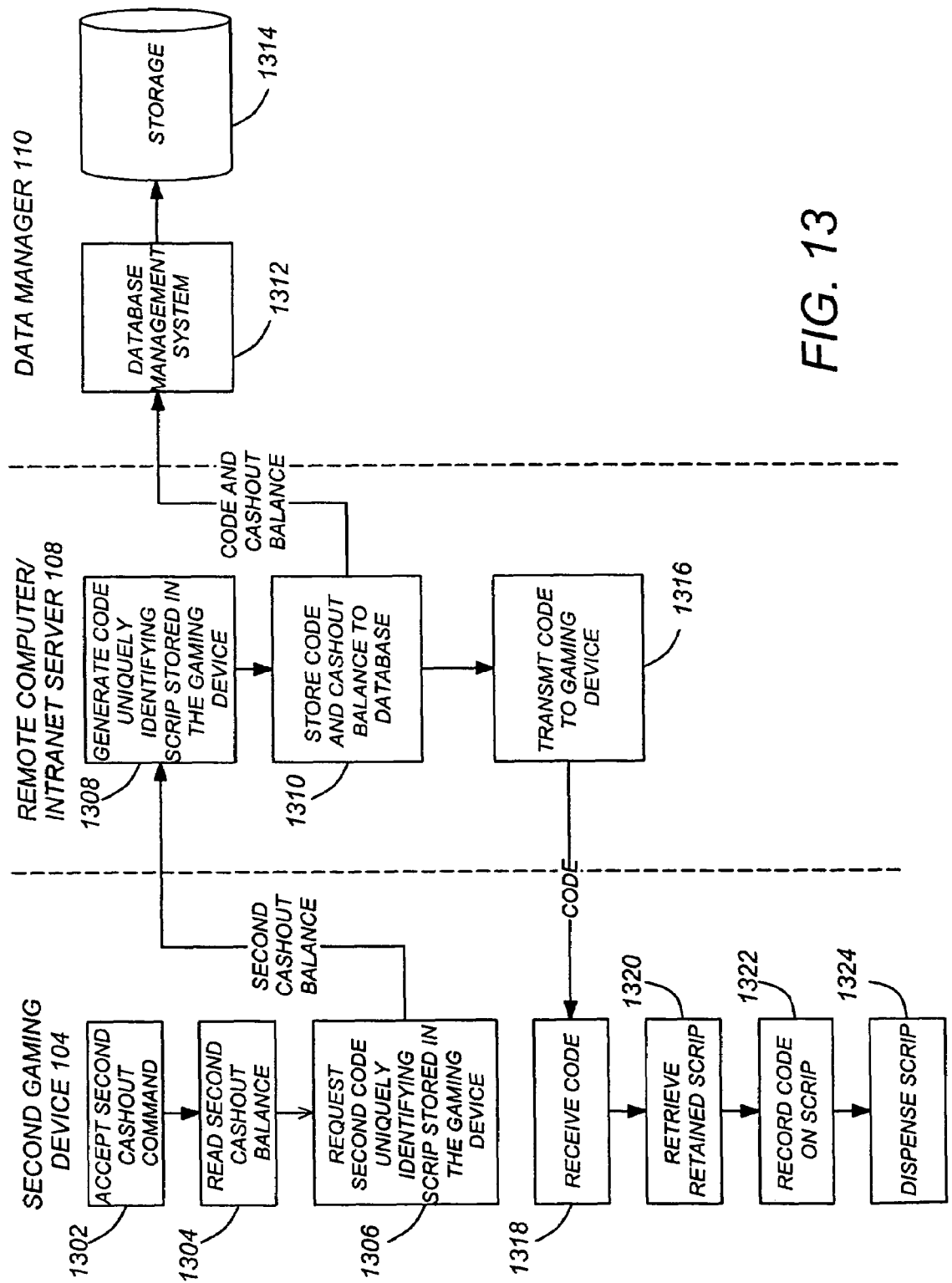

FIGS. 11-13 are flow charts illustrating an alternative embodiment of the present invention in which the scrip need not be pre-coded before insertion into the gaming device 104 for distribution. After a cash-out command is accepted 1102, the cash out balance is determined 1104. The gaming device 104 then obtains a code uniquely identifying the scrip. In this embodiment, this is accomplished by sending a message requesting the code to the remote computer/intranet server 108. In this embodiment, this message includes the cash-out balance. The message is received by the remote computer/intranet server 108, which generates a code uniquely identifying the scrip, as shown in block 1108. The generated code and the cash-out balance are then stored in the data manager 110, as shown in blocks 1110-1114. The code is also transmitted to the gaming device, as shown in blocks 1116 and 1118. The gaming device 104 then records the code on the scrip and dispenses the scrip to the user, as shown in blocks 1120 and 1122. In embodiments in which the scrip code is visually manifested (such as a bar code), this is accomplished via a printer or similar device. In embodiments in which the scrip code is magnetically manifested, this is accomplished via a magnetic recording device.

As illustrated in FIG. 12, the user may then take the scrip to a second gaming device 104 for further play. After the user selects a second gaming device 104, the scrip is inserted into the second gaming device 104, and the scrip is accepted, as shown in block 1202. The scrip code is then read, and transmitted to the remote computer/intranet server 108, as shown in blocks 1204 and 1206. As described above, the scrip code may be either visually or magnetically manifested, or both. The remote computer/intranet server 108 accepts the scrip code, and, via the data manager 110, verifies the scrip code and retrieves the cash out balance, as shown in blocks 1208-1214. This information is then transmitted to the second gaming device 104 as shown in block 1216.

The second gaming device 104 receives the cash-out balance and issues the appropriate number of credits to the user, as determined from the cash-out balance and the value of each credit on the second gaming device 104. These steps are shown in blocks 1218-1224. Next, if desired, particularly if the scrip code is manifested on a magnetic strip, the code may be erased from the scrip before the scrip is stored for re-use, as shown in block 1224. This make it difficult for the scrip to be collected and used to determine how the scrip code assignment algorithms operate.

After the user has completed gaming on the second gaming device 104, the user issues a second cash-out command, as shown in block 1302. A second cash-out balance is determined and a second code is requested of the remote computer/intranet server 108. As before, the remote computer/intranet server 108 generates a code and stores the code and cashout balance in the data manager 110 for later use. These operations are illustrated in blocks 1308-1310. The code is then transmitted to the second gaming device 104, as shown in blocks 1316 and 1318. One of the retained scrip in the second gaming device is then retrieved, and the code generated by the remote computer/intranet server 108 is recorded on the scrip. The scrip is then dispensed to the user. These operations are depicted in blocks 1320-1324.

Figure 14:
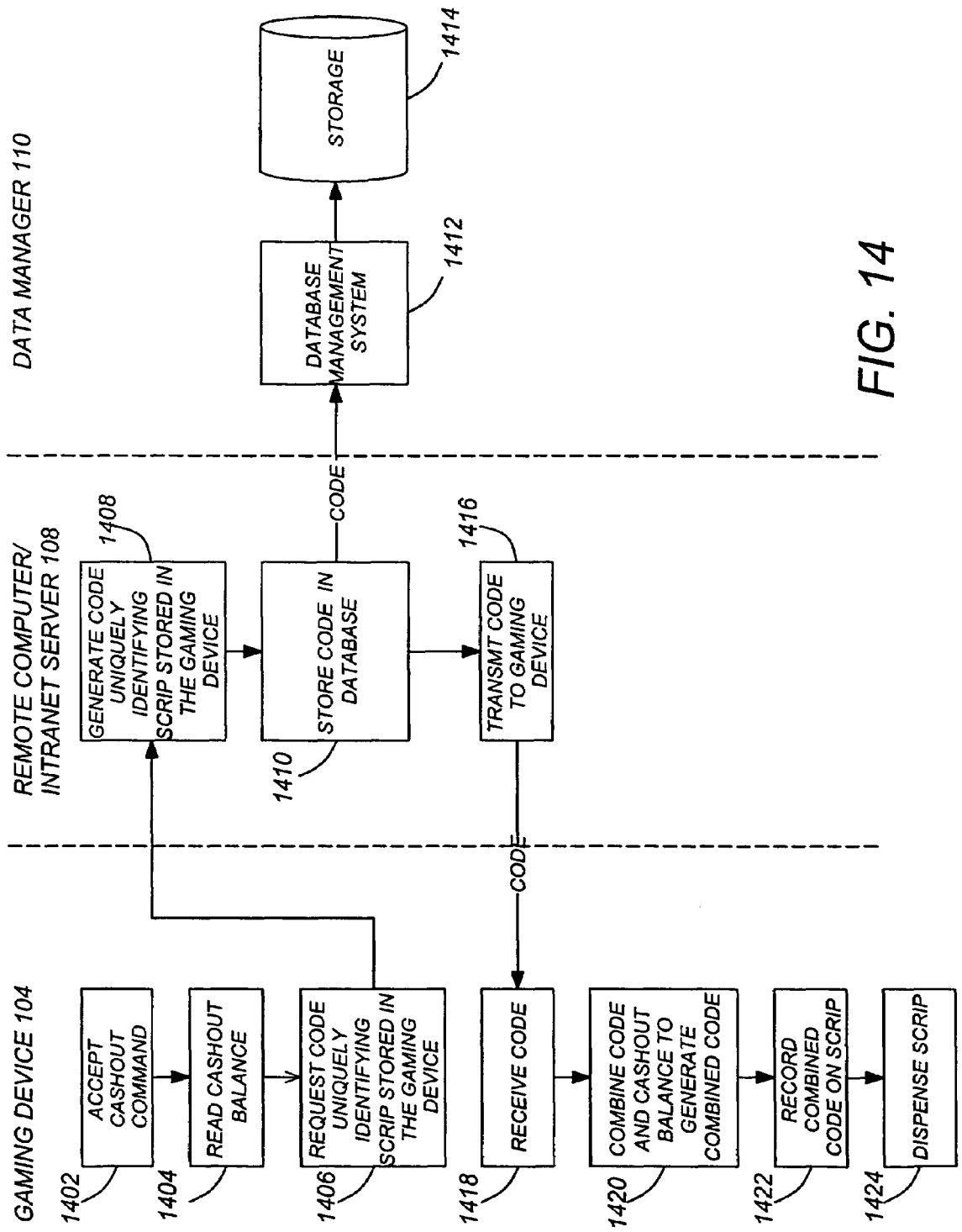
FIGS. 14-16 are flow charts illustrating another embodiment of the present invention in which the scrip need not be pre-coded before insertion into the gaming device for distribution, and in which the cash-out value is not transmitted from the gaming device to the remote computer/Internet server.
Figure 15:
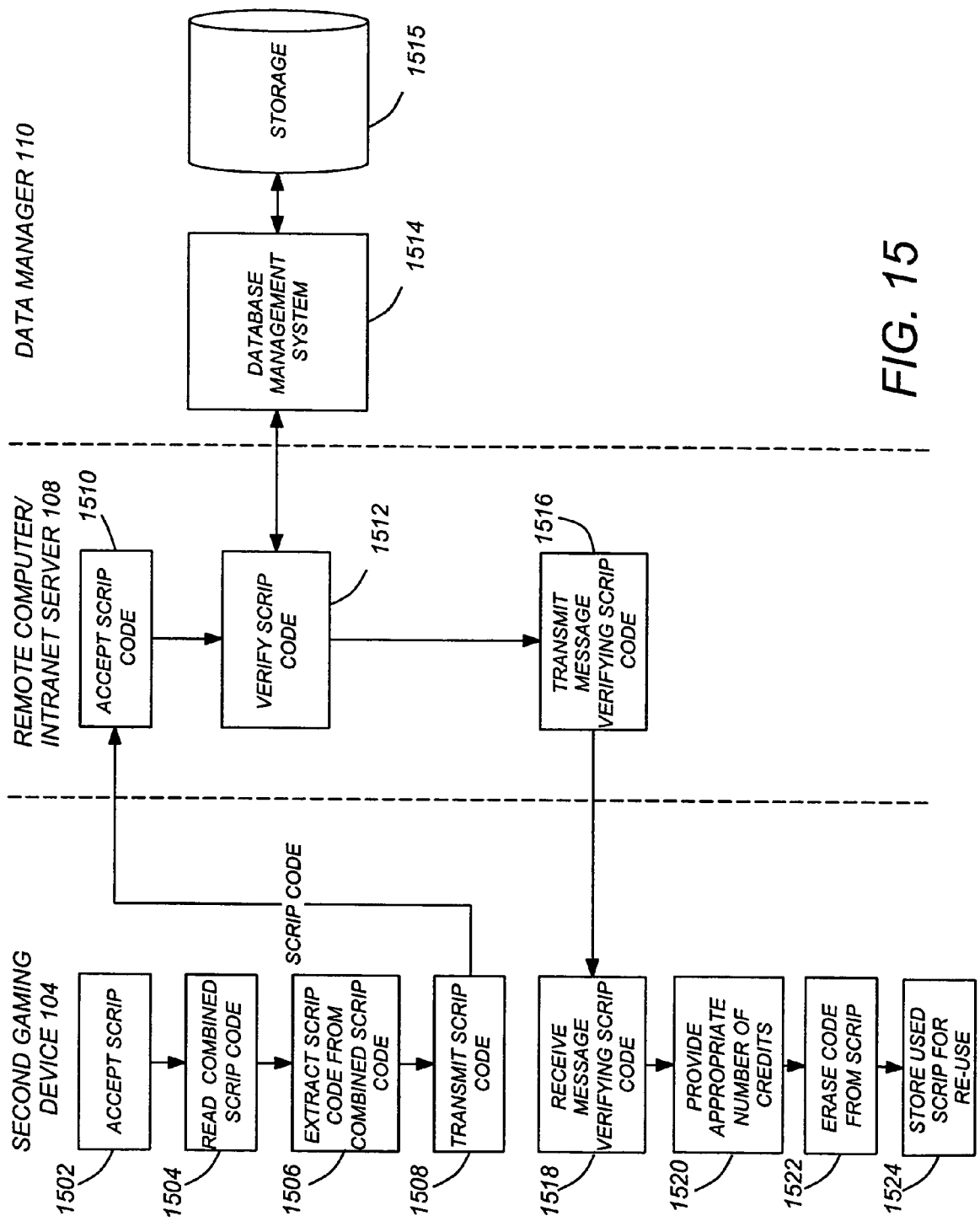
Figure 16:
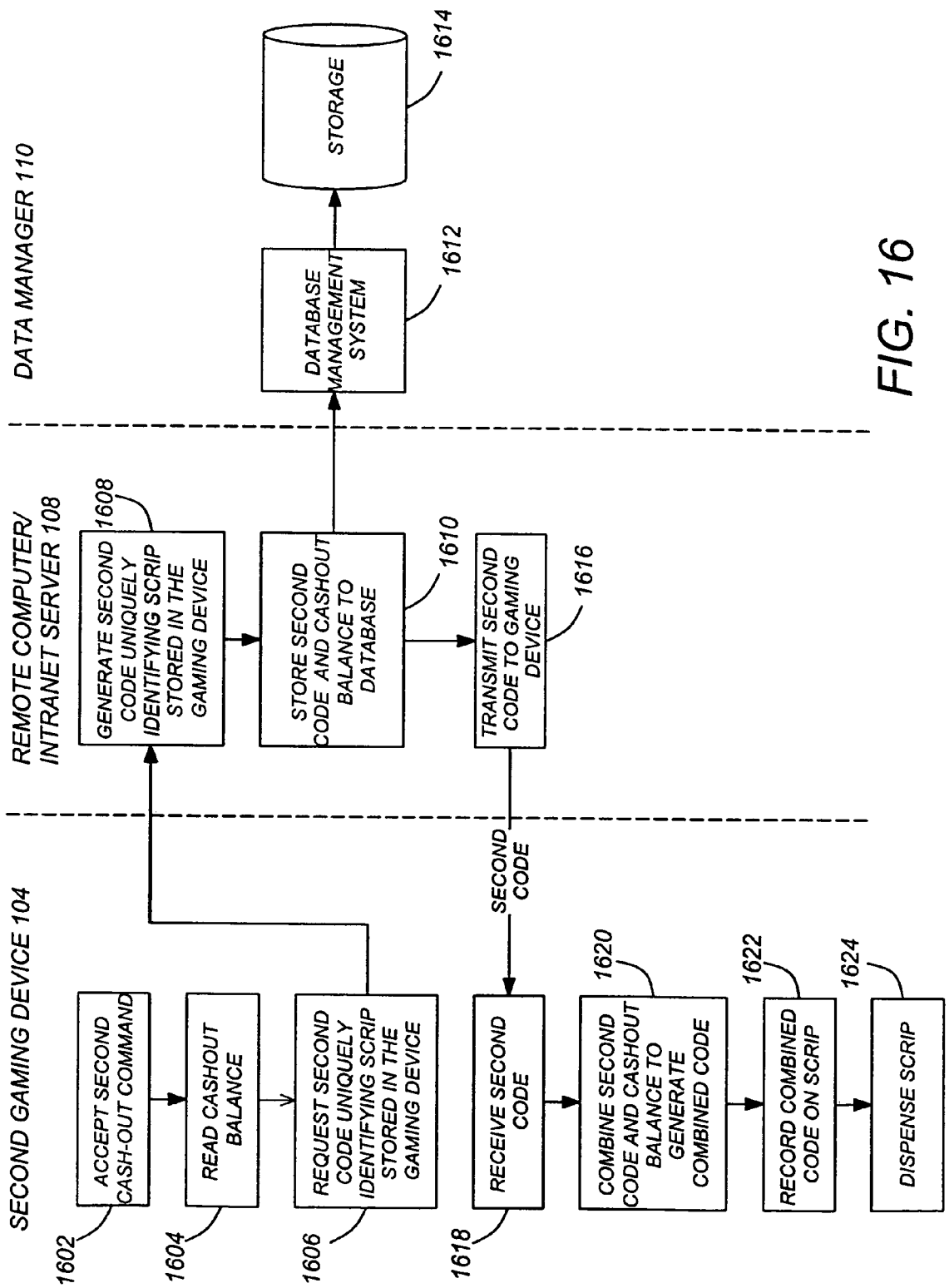

FIGS. 14-16 are flow charts illustrating another embodiment of the present invention in which the scrip need not be pre-coded before insertion into the gaming device 104 for distribution. In this embodiment, the cash-out value is not transmitted from the gaming device to the remote computer/Internet server 1408. After the gaming device accepts a cash-out command 1402, the cash-out balance is read 1404, and the gaming device 104 sends a message to the remote computer/intranet server 108 to request 1406 a code uniquely identifying the scrip that is about to be issued. The remote computer/intranet server 108 generates a code, and stores the code in the database, as shown in blocks 1408-1414. The code is then transmitted 1416 to the gaming device 104. The gaming device receives 1418 the code, and combines 1420 the code with the cashout balance to generate a combined code that is recorded 1422 on the scrip (f or example, by printing a bar code, or by writing information on a magnetic strip on the scrip). After this is accomplished, the scrip is dispensed 1424. If desired, the recorded combined code can be scanned and transmitted to the remote computer/intranet server 108 for possible storage in the data manager 110. Further, the remote computer/intranet server 108 can verify that the combined code represents a valid code combination.

As shown in FIG. 15, the user can then bring the dispensed scrip to a second gaming device 104. The second gaming device 104 then accepts 1502 the scrip, reads 1504 the combined scrip code, and extracts 1506 the scrip code from the combined scrip code. The scrip code is then transmitted 1508 to the remote computer/intranet server 108 for verification, as shown in blocks 1510-1514. The remote computer/intranet server 108 then transmits 1518 a message verifying the scrip code. The message is received by the second gaming device 1518, and the appropriate number of credits (determined from the cash-out value extracted from the combined scrip code and the value of each credit in the second gaming device 104) are provided 1520. At this point, the scrip is stored 1524 for redistribution and re-use in future transactions.

Alternatively, in cases where the combined scrip code is transmitted to the remote computer/intranet server 108 and stored in the data manager, the second gaming device 104 can simply transmit the combined scrip code to the remote computer/intranet server 108 for verification. The remote computer/intranet server 108 can then verify both the authenticity of the scrip (using the code) and the cash-out value amount before transmitting a message verifying the scrip. If the scrip is determined to be unauthorized, or if the cash-out value read from the combined scrip code does not match that which was stored in the data manager 110, credits are not issued. If desired, the scrip can be retained, and an alert may be transmitted to the appropriate security personnel.

As shown in FIG. 16, after the user has concluded gaming, the user may issue a cash-out command that is accepted by the second gaming device 104. Again, the cash out balance is read 1604, and a second code is requested 1606 from the remote computer/Internet server 108. This code is generated 1608 and stored in the data manager, as shown in blocks 1608-1614. The generated code is transmitted 1616 to the second gaming device 104, where a second combined code is generated (from the second code and the current cash-out balance), and recorded on one of the scrip units stored in the second gaming device. Since the second gaming device retains used scrip for later re-use and distribution, such used scrip can be used to record the new combined code before the scrip is dispensed to the user. This is illustrated in blocks 1618-1624.

Figure 17:
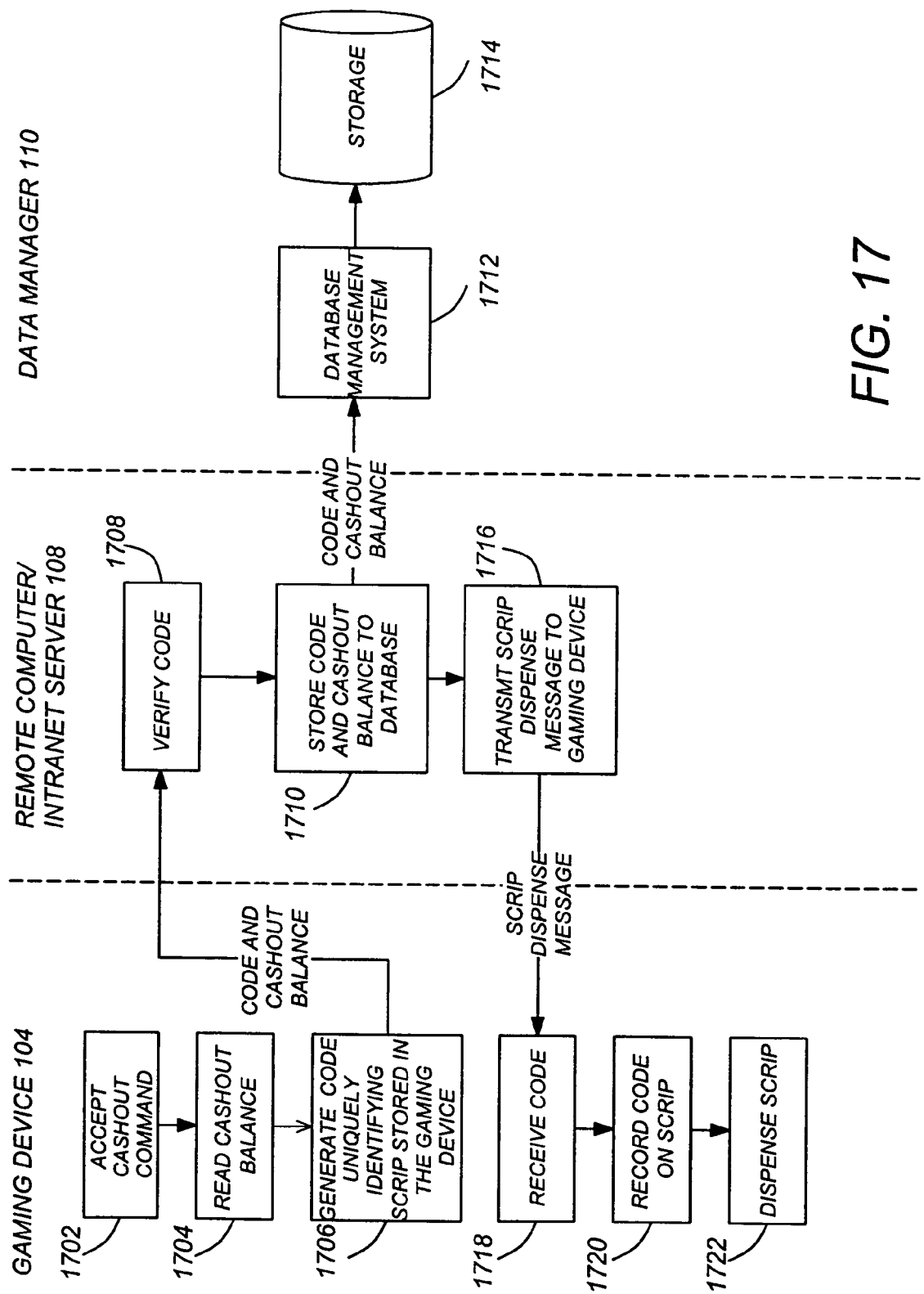
FIGS. 17-19 are flow charts illustrating another embodiment of the present invention in which the scrip need not be pre-coded before insertion into the gaming device for distribution and in which the gaming device generates the scrip-unique code.
Figure 18:
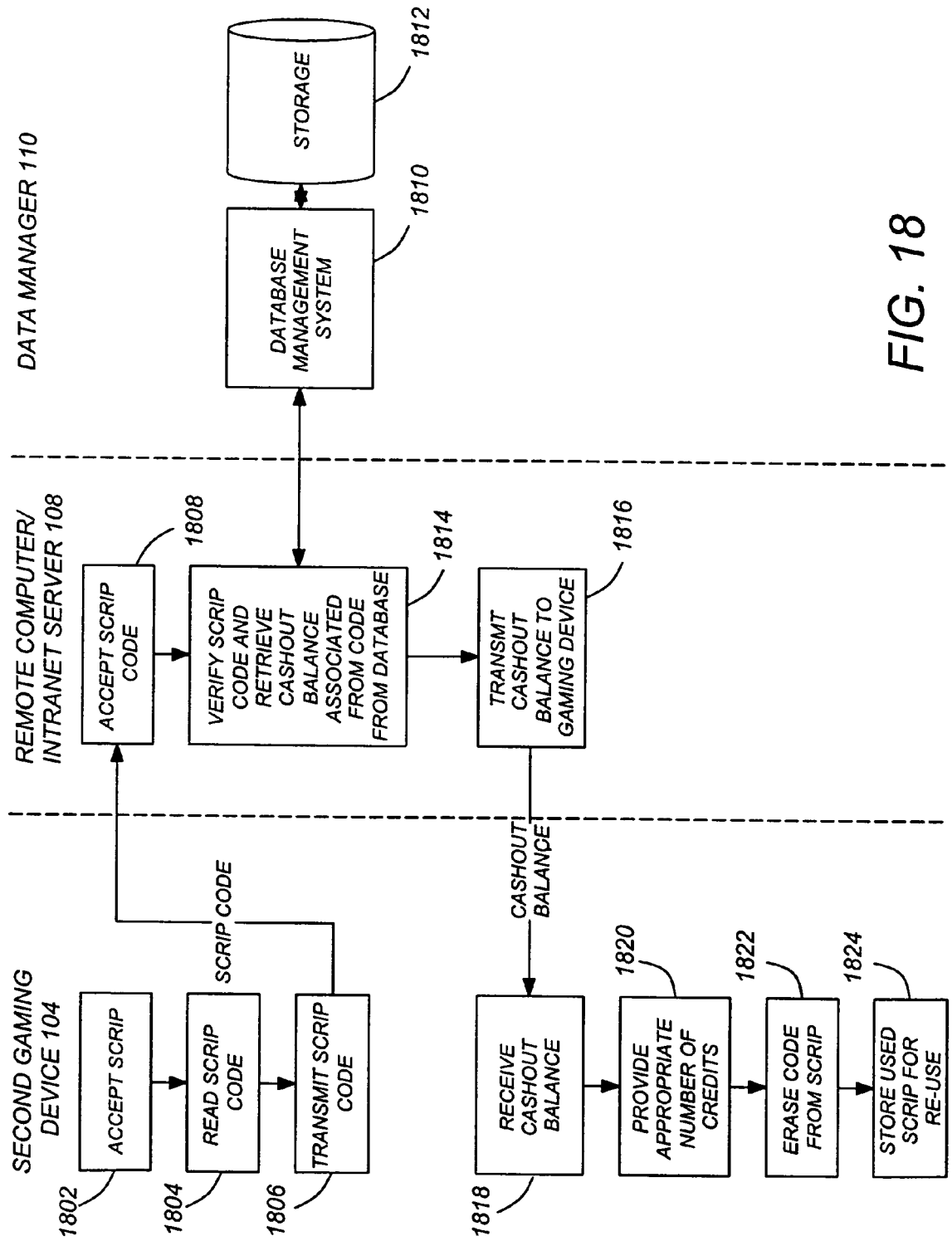
Figure 19:
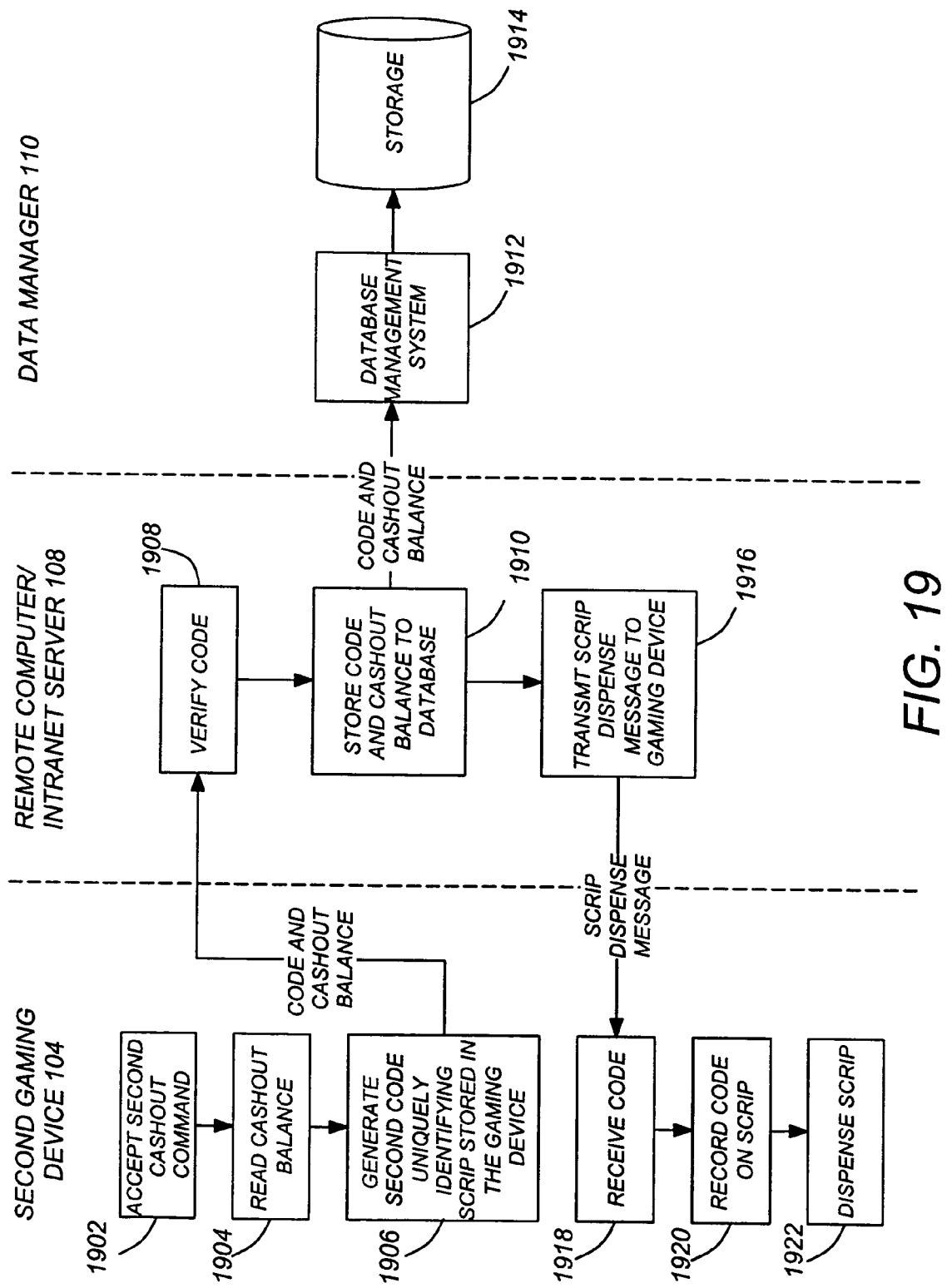

FIGS. 17-19 are flow charts illustrating an other embodiment of the present invention in which the scrip need not be pre-coded before insertion into the gaming device 104f or distribution and in which the gaming device 104 generates the scrip-unique code. After the user has completed play on the gaming device 104, a cash-out command is accepted 1702, and the cash-out balance is read 1704. The cash-out balance is determined 1704, and the gaming device 104 generates a code that will uniquely identify the scrip that is about to be dispensed to the user. This code can be generated by combination of a use of code uniquely identifying the gaming machine among the gaming machines in the gaming system 100 and a code uniquely identifying the scrip within the gaming machine. Alternatively, the code can simply be generated by the gaming machine and transmitted to the remote computer/intranet server 108. At this point, the remote computer/intranet server 108 can verify 1708 code has already been assigned to a different scrip, and/or that the generated code is included in the set of permissible codes. In the unlikely event that the gaming machine generated code is already assigned to an other scrip occurs, the remote computer/intranet server 108 can send a message to the gaming device to generate another code, or the remote computer/intranet server 108 can generate an other code and transmit the code to the gaming device 104. Further, the message transmitted from the gaming device 104 to the remote computer/intranet server 108 can include just the scrip unique code, the scrip unique code and the cash-out balance, or a combined code having both the code and the cash-out balance.

The code and cash-out balance can then be stored in the data manager, as shown in blocks 1710-1714, and a scrip dispense message is transmitted 1716 to the gaming device. With this embodiment, as with previously described embodiments having a scrip dispense message, messages between the gaming device 104 and the remote computer/intranet server 108 can be coded using either private key or public key techniques to assure that bogus messages are not received and to maintain communication security between the gaming device 104 and the remote computer/intranet server 108. After the gaming device 104 receives 1718, the code is recorded 1720 on the scrip (either by applying a magnetic field to a magnetic strip on the scrip or by printing a visually manifested code such as a bar code). Finally, the scrip is dispensed 1722. If desired, code recorded on the scrip can be re-scanned to assure that the proper code was recorded.

The user can then take the dispensed scrip, and insert it into a second gaming device 104. As shown in FIG. 18, the second gaming device 104 accepts 1802 the scrip, reads 11804 the scrip code, and transmits 1806 the scrip code to the remote computer/Internet server 108. The remote computer/intranet server 108 then accesses the information in the data manager 110 to verify the scrip code and retrieve the cash-out balance associated with the code. If the code is verified, the cash-out balance is transmitted 1816 to the second gaming device 104. The received 1818 cash-out balance is used to determine the appropriate number of credits, and such credits are provided 1820. The scrip, whose code may optionally be erased 1822 is then stored 1824 for re-use. When the user is finished gaming with the second gaming device 104, a cash-out command is accepted 1902, and the current cash-out balance 1904 is read. The second gaming device 104 generates a second code uniquely identifying the scrip that is about to be dispensed, using the techniques described above. The code and cash-out balance is then transmitted to the remote computer/intranet server 108 where the code is verified 1908. The verified code and the cash-out balance can then be stored in the data manger 110, as shown in blocks 1910-1914. A scrip dispense message can then be transmitted 1916 to the second gaming device 104. The second gaming device 104, up on receiving the scrip dispense message, retrieves a scrip from storage (which may have been a scrip which was used before), records 1920 the newly generated code on the scrip, and dispenses 1922 the scrip to the user. With respect to FIGS. 17-19 it should also be noted that the code and cash-out balance transmitted from the gaming devices 104 to the remote computer/intranet server 108 may be a combined code having both unique code information and the cash-out balance, as described in connection with FIGS. 14-16.

Figure 20:
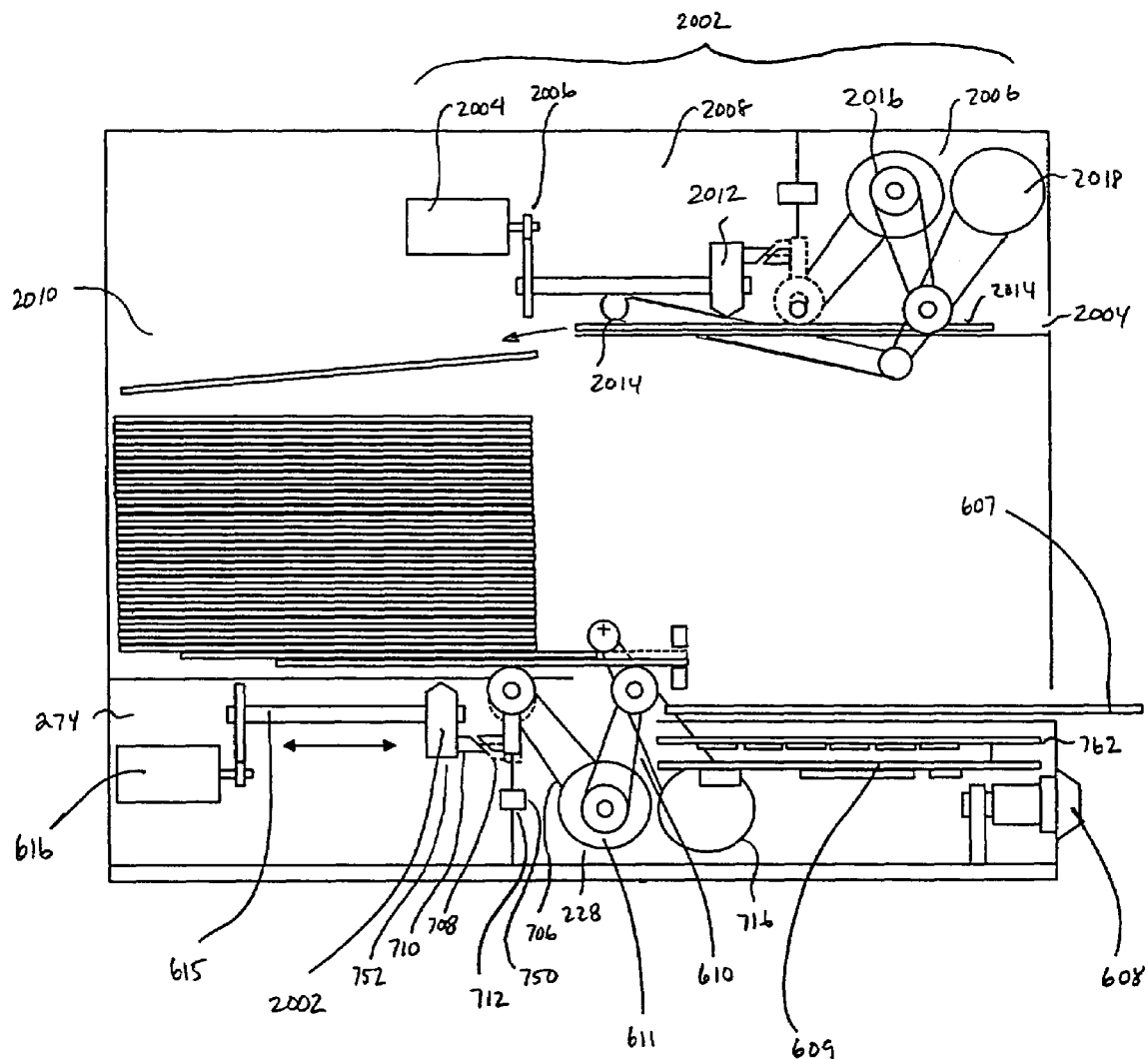
FIG. 20 is an illustration an embodiment of the scrip dispenser 226 with a scrip acceptance unit 2002 configured to permit redistribution and re-use of scrip.

FIG. 20 is an illustration of an embodiment of the scrip dispenser 226 with a scrip acceptance unit 2002 configured to permit redistribution and re-use of scrip. Also in this embodiment, the scrip scanner 274 may include the capability of recording scrip codes on the scrip 617, as well as reading the codes. This may be accomplished with separate reading and writing units, or with a combined reading/writing unit as shown. In this embodiment, the scrip scanner includes a transducer 2002 which is capable of reading and writing scrip code onto the scrip 617. In embodiments wherein the scrip code is an visually manifested code, the transducer 2002 is an optical transducer capable of reading and printing visually manifested codes such as bar codes. In embodiments wherein the scrip code is a magnetically manifested code, the transducer is a magnetic record/playback/erase head.

In this embodiment, a scrip acceptance unit 2002 is included which accepts scrip via aperture 2004. Once the inserted scrip is detected (by optical, magnetic, or mechanical sensors), a scrip acceptance unit drive system 2006 moves the scrip into position for scanning by the scrip scanner 2008. After the appropriate operations have been completed, the scrip is passed to a scrip storage unit 2010 where they may be re-used by the scrip dispensing unit 228. In the illustrated embodiment, the scrip acceptance unit 2002 includes a scrip acceptance unit drive system 2006 and scrip scanner 2006 of similar design to that which is described above with respect to FIG. 7. The scrip acceptance unit drive system 2006 also includes a scrip ejection wheel 2014 which may be driven by one of the pulleys or wheels driven by a scrip acceptance unit drive system drive motor 2016, or a second scrip acceptance unit drive system motor 2018. Ordinarily, the scrip acceptance unit 2002 need only scan the scrip to assure the proper code is manifested there on, but the transducer 2012 of the scrip acceptance unit 2002 may also include the capability of erasing the scrip 2014 introduced through the aperture 2004 before depositing the scrip into the scrip storage unit 2010. The transducer 2012 may also include the capability of recording a random message on the scrip 2014 to render them unreadable.

CONCLUSION

This concludes the description of the preferred embodiments of the present invention. In summary, the present invention discloses a method, apparatus, and article of manufacture for transferring credits from one gaming device to another via the use of coded scrip.

The method comprises the steps of accepting a cash-out command in the gaming device, scanning a magnetically manifested code uniquely identifying a scrip stored in the gaming device, transmitting a cash-out message comprising the code to a remote process or having access to a database configured to store and retrieve codes from a plurality of gaming devices, receiving a scrip dispense message from the remote processor, and dispensing the scrip. The apparatus comprises a scrip storage unit, a scrip dispensing unit having a scrip transducer for reading and recording a magnetically manifested code on a scrip retrieved from the scrip storage unit, and a processor, communicatively coupled to the scrip transducer and a remote computer having access to a database for storing and retrieving code information from the plurality of gaming devices.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by the details of the embodiments presented in this description. The above specification, examples, and data provide a complete description of the manufacture and use of the invention. Many embodiments of the invention can be made with out departing from the spirit and scope of the invention.

What is claimed is:

1. A method for transferring game credits among a plurality of gaming devices, comprising the steps of:
   accepting a cash-out command in a first gaming device;
   retrieving a reusable card stored in the first gaming device, the reusable card accepted into the first gaming device from another of the plurality of gaming devices;
   recording a code uniquely identifying the reusable card stored in the first gaming device on the reusable card;
   dispensing the reusable card;
   accepting the reusable card in a second gaming device;
   reading the code;
   providing a number of credits in the second gaming device based upon the read code; and
   storing the reusable card in the second gaming device for reuse by the second gaming device wherein:
   the step of recording a code uniquely identifying the reusable card stored in the first gaming device comprises the steps of:
      transmitting a cashout balance to a remote computer;
      receiving a code from the remote computer;
      recording the code on the reusable card; and
   the step of recording a second code uniquely identifying the reusable card retrieved from being stored in the second gaming device comprises the steps of
      transmitting a second cashout balance to the remote computer;
      receiving a second code from the remote computer; and
      recording the second code on the reusable card.

2. The method of claim 1, further comprising the steps of:
   accepting a second cash out command in the second gaming device;
   recording a second code uniquely identifying the reusable card retrieved from being stored in the second gaming device; and
   dispensing the reusable card.

3. The method of claim 1, wherein the card is self-authenticating.

4. An apparatus for transferring game credits among a plurality of gaming devices, comprising:
   means for accepting a cash-out command in a first gaming device;
   means for retrieving a reusable card stored in the first gaming device, the reusable card accepted into the first gaming device from another of the plurality of gaming devices;
   means for recording a code uniquely identifying a reusable card stored in the first gaming device on the reusable card;
   means for dispensing the reusable card;
   means for accepting the reusable card in a second gaming device;
   means for reading the code;
   means for providing a number of credits in the second gaming device based upon the read code; and
   means for storing the reusable card in the second gaming device for reuse by the second gaming device; wherein:
   the means for recording a code uniquely identifying the reusable card stored in the first gaming device comprises:
      means for transmitting a cashout balance to a remote computer;
      means for receiving a code from the remote computer;
      means for recording the code on the reusable card; and
   the means for recording a second code uniquely identifying the reusable card retrieved from being stored in the second gaming device comprises
      means for transmitting a second cashout balance to the remote computer;
      means for receiving a second code from the remote computer; and
      means for recording the second code on the reusable card.

5. The apparatus of claim 4, further comprising:
   means for accepting a second cash out command in the second gaming device;
   means for recording a second code uniquely identifying the reusable card retrieved from being stored in the second gaming device; and
   means for dispensing the reusable card.

6. The apparatus of claim 4, wherein the card is self-authenticating.

7. A method for transferring game credits among a plurality of gaming devices, comprising the steps of:
   accepting a cash-out command in a first gaming device;
   retrieving a reusable card stored in the first gaming device, the reusable card accepted into the first gaming device from another of the plurality of gaming devices;
   recording a code uniquely identifying the reusable card stored in the first gaming device on the reusable card;
   dispensing the reusable card;
   accepting the reusable card in a second gaming device;
   reading the code;
   providing a number of credits in the second gaming device based upon the read code; and
   storing the reusable card in the second gaming device for reuse by the second gaming device; wherein
   the step of recording a code uniquely identifying the reusable card stored in the first gaming device comprises the steps of:
      transmitting a request for a code to a remote computer;
      receiving the requested code from the remote computer;
      generating a second combined code from the received code and a cashout balance;
      recording the combined code on the reusable card; and
   the step of recording a second code uniquely identifying the reusable card retrieved from being stored in the second gaming device comprises the steps of
      transmitting a second request for a code to the remote computer;
      receiving the requested second code from the remote computer;

generating a second combined code from the received code and a second cashout balance;
recording the second code on the reusable card.

8. The method of claim 7, further comprising the steps of:
accepting a second cash out command in the second gaming device;
recording a second code uniquely identifying the reusable card retrieved from being stored in the second gaming device; and
dispensing the reusable card.

9. The method of claim 7, wherein the card is self-authenticating.

10. A method for transferring game credits among a plurality of gaming devices, comprising the steps of:
accepting a cash-out command in a first gaming device;
retrieving a reusable card stored in the first gaming device, the reusable card accepted into the first gaming device from another of the plurality of gaming devices;
recording a code uniquely identifying the reusable card stored in the first gaming device on the reusable card;
dispensing the reusable card;
accepting the reusable card in a second gaming device;
reading the code;
providing a number of credits in the second gaming device based upon the read code; and
storing the reusable card in the second gaming device for reuse by the second gaming device; wherein:
the step of recording a code uniquely identifying the reusable card stored in the first gaming device comprises the steps of:
generating the code in the first gaming device;
transmitting the code and a cashout balance to a remote computer;
receiving a dispense message from the remote computer;
recording the generated code on the reusable card;
the step of recording a second code uniquely identifying the reusable card retrieved from being stored in second gaming device comprises the steps of:
generating a second code in the second gaming device
transmitting the second code and a second cashout balance to the remote computer;
receiving a dispense message from the remote computer; and
recording the second code on the reusable card.

11. The method of claim 10, further comprising the steps of:
accepting a second cash out command in the second gaming device;
recording a second code uniquely identifying the reusable card retrieved from being stored in the second gaming device; and
dispensing the reusable card.

12. The method of claim 10, wherein the card is self-authenticating.

13. An apparatus for transferring game credits among a plurality of gaming devices, comprising:
means for accepting a cash-out command in a first gaming device;
means for retrieving a reusable card stored in the first gaming device, the reusable card accepted into the first gaming device from another of the plurality of gaming devices;
means for recording a code uniquely identifying a reusable card stored in the first gaming device on the reusable card;
means for dispensing the reusable card;
means for accepting the reusable card in a second gaming device;
means for reading the code;
means for providing a number of credits in the second gaming device based upon the read code; and
means for storing the reusable card in the second gaming device for reuse by the second gaming device; wherein:
the means for recording a code uniquely identifying the reusable card stored in the first gaming device comprises:
means for transmitting a request for a code to a remote computer;
means for receiving the requested code from the remote computer;
means for generating a second combined code from the received code and a cashout balance;
means for recording the combined code on the reusable card; and
the means for recording a second code uniquely identifying the reusable card retrieved from being stored in the second gaming device comprises the steps of
means for transmitting a second request for a code to the remote computer;
means for receiving the requested second code from the remote computer;
means for generating a second combined code from the received code and a second cashout balance;
means for recording the second code on the reusable card.

14. The apparatus of claim 13, further comprising:
means for accepting a second cash out command in the second gaming device;
means for recording a second code uniquely identifying the reusable card retrieved from being stored in the second gaming device; and
means for dispensing the reusable card.

15. The apparatus of claim 13, wherein the card is self-authenticating.

16. An apparatus for transferring game credits among a plurality of gaming devices, comprising:
means for accepting a cash-out command in a first gaming device;
means for retrieving a reusable card stored in the first gaming device, the reusable card accepted into the first gaming device from another of the plurality of gaming devices;
means for recording a code uniquely identifying a reusable card stored in the first gaming device on the reusable card;
means for dispensing the reusable card;
means for accepting the reusable card in a second gaming device;
means for reading the code;
means for providing a number of credits in the second gaming device based upon the read code; and
means for storing the reusable card in the second gaming device for reuse by the second gaming device; wherein:
the means for recording a code uniquely identifying the reusable card stored in the first gaming device comprises:
means for generating the code in the first gaming device;
means for transmitting the code and a cashout balance to a remote computer;
means for receiving a dispense message from the remote computer
means for recording the generated code on the reusable card;

the means for recording a second code uniquely identifying the reusable card retrieved from being stored in second gaming device comprises:

means for generating a second code in the second gaming device;

means for transmitting the second code and a second cashout balance to the remote computer; and means for receiving a dispense message from the remote computer; and recording the second code on the reusable card.

17. The apparatus of claim 16, further comprising:

means for accepting a second cash out command in the second gaming device;

means for recording a second code uniquely identifying the reusable card retrieved from being stored in the second gaming device; and means for dispensing the reusable card.

18. The apparatus of claim 16, wherein the card is self-authenticating.

* * * * *